US009634808B2

United States Patent
Nagata et al.

(10) Patent No.: US 9,634,808 B2
(45) Date of Patent: Apr. 25, 2017

(54) RADIO COMMUNICATION SYSTEM, RADIO COMMUNICATION METHOD, USER TERMINAL AND RADIO BASE STATION

(71) Applicant: NTT DOCOMO, INC., Tokyo (JP)

(72) Inventors: Satoshi Nagata, Tokyo (JP); Mingju Li, Beijing (CN); Xiang Yun, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 1 day.

(21) Appl. No.: 14/431,411

(22) PCT Filed: Aug. 16, 2013

(86) PCT No.: PCT/JP2013/072007
§ 371 (c)(1),
(2) Date: Mar. 26, 2015

(87) PCT Pub. No.: WO2014/050350
PCT Pub. Date: Apr. 3, 2014

(65) Prior Publication Data
US 2015/0256307 A1 Sep. 10, 2015

(30) Foreign Application Priority Data
Sep. 28, 2012 (JP) ................................. 2012-217099

(51) Int. Cl.
*H04W 4/00* (2009.01)
*H04L 5/00* (2006.01)
(Continued)

(52) U.S. Cl.
CPC ......... *H04L 5/0035* (2013.01); *H04B 17/345* (2015.01); *H04L 1/00* (2013.01);
(Continued)

(58) Field of Classification Search
CPC ... H04L 5/0035; H04L 5/0051; H04W 84/042
See application file for complete search history.

(56) References Cited

U.S. PATENT DOCUMENTS

| 2011/0317657 | A1* | 12/2011 | Chmiel | H04L 5/001 370/331 |
| 2013/0201840 | A1* | 8/2013 | Sorrentino | H04L 25/0204 370/252 |
| 2013/0208604 | A1* | 8/2013 | Lee | H04L 25/0226 370/252 |

OTHER PUBLICATIONS

NTT Docomo, "Downlink Control Signaling for Rel-11 CoMP," 3GPP TSG RAN WG1 Meeting #70; R1-123366; Qingdao, China; Aug. 13-17, 2012 (6 pages).
(Continued)

*Primary Examiner* — Lonnie Sweet
(74) *Attorney, Agent, or Firm* — Osha Liang LLP

(57) ABSTRACT

To perform rate matching appropriately even when downlink signals are transmitted from a plurality of transmission points to a user terminal, a radio communication system having a user terminal capable of coordinate multi-point transmission and reception with several radio base stations is provided. A radio base station transmits downlink control information including bit information defining a predetermined rate matching pattern to the user terminal. The user terminal receives the downlink control information and performs rate matching based on the bit information defining the rate matching pattern. A combination of a cell-specific reference signal pattern and an interference measurement reference signal pattern in the case of transmission from several radio base stations each using an MBSFN subframe or NCT is defined in predetermined bits. The user terminal performs rate matching based on the bit information and the subframe configuration and interference measurement reference signal pattern of the radio base station.

11 Claims, 24 Drawing Sheets

(51) Int. Cl.
*H04L 1/00* (2006.01)
*H04W 24/00* (2009.01)
*H04W 28/22* (2009.01)
*H04W 48/00* (2009.01)
*H04B 17/345* (2015.01)
*H04W 84/04* (2009.01)
*H04W 88/08* (2009.01)

(52) U.S. Cl.
CPC ............ *H04L 5/005* (2013.01); *H04L 5/0051* (2013.01); *H04W 24/00* (2013.01); *H04W 28/22* (2013.01); *H04W 48/00* (2013.01); *H04W 84/042* (2013.01); *H04W 88/08* (2013.01)

(56) References Cited

OTHER PUBLICATIONS

ZTE, "Downlink control signaling for CoMP," 3GPP TSG RAN WG1 Meeting #70; R1-123843; Qingdao, China; Aug. 13-17, 2012 (4 pages).

ZTE, "Downlink control signaling for CoMP," 3GPP TSG RAN WG1 Meeting #69; R1-122143; Prague, Czech Republic; May 21-25, 2012 (5 pages).

NTT DOCOMO, "Downlink Control Signaling for Rel-11 CoMP," 3GPP TSG RAN WG1 Meeting #70bis; R1-124251; San Diego, CA, USA; Oct. 8-12, 2012 (5 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)," Sep. 2006 (57 pages).

International Search Report issued in PCT/JP2013/072007, mailed Sep. 17, 2013 (1 page).

Extended European Search Report issued in corresponding European Application No. 13842657.2, mailed on Apr. 4, 2016 (13 pages).

CATT; "Discussion on interface measurement mechanisms"; 3GPP TSG RAN WG1 Meeting #69, R1-122040; Prague, Czech Republich; May 21-25, 2012 (5 pages).

Alcatel-Lucent, Alcatel-Lucent Shanghai Bell; "Remaining Issues of CSI-RS and Muting Configurations in MBSFN subframes"; 3GPP TSG RAN WG1 Meeting #64, R1-110794; Taipei; Feb. 21-25, 2011 (2 pages).

Office Action issued in the counterpart Mexican Patent Application No. MX/a/2015/003875, mailed Jul. 21, 2016 (4 pages).

Office Action issued in the counterpart Japanese Patent Application No. 2012-217099, mailed Nov. 22, 2016 (9 pages).

* cited by examiner

–·–·▶ SUBFRAME #1
–··–··▶ SUBFRAME #2
– – –▶ SUBFRAME #3
———▶ SUBFRAME #4

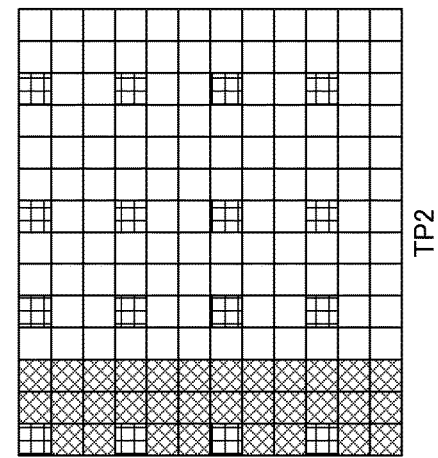
FIG.2C
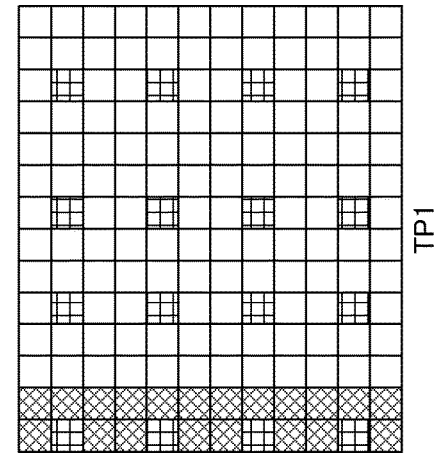 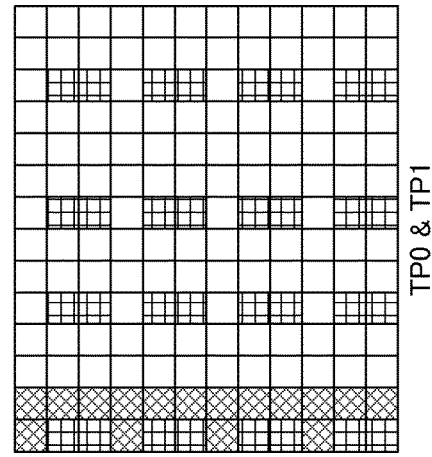
FIG.2B  FIG.2D
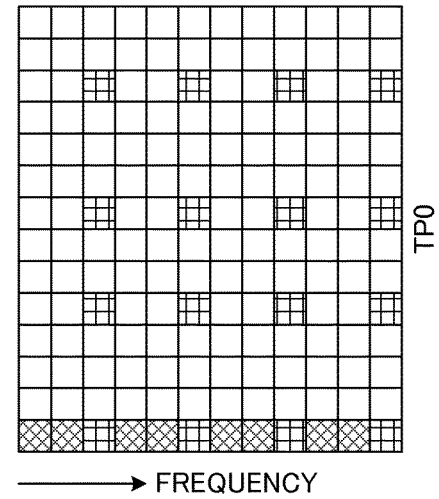
FIG.2A

MBSFN SUBFRAME

NEW CARRIER TYPE (NCT)

SCHEDULING RESULTS : TP1(NORMAL) & TP2(MBSFN OR NCT)
RATE MATCHING : ACCORDING TO CRS PATTERN OF TP1

CRS RE
PDCCH RE
PDSCH RE

TIME
FREQUENCY

FIG.4A

| DCI | RATE MATCHING PATTERN |
|---|---|
| 00 | CRS PATTERN OF TP0 |
| 01 | CRS PATTERN OF TP1 |
| 10 | CRS PATTERN OF TP2 |
| 11 | CRS PATTERN OF MBSFN SUBFRAME OR NCT |

TABLE 1

FIG.4B

| SCHEDULED RESULTS | RATE MATCHING PATTERN |
|---|---|
| TP0 | CRS PATTERN OF TP0 |
| TP1 | CRS PATTERN OF TP1 |
| TP2 | CRS PATTERN OF TP2 |
| TP0&TP1 | CRS PATTERN OF MBSFN SUBFRAME OR NCT |
| TP0&TP2 | |
| TP1&TP2 | |
| TP0&TP1&TP2 | |

TABLE 2

FOR UE1 : NOTIFIED OF THE LOCATIONS IN FREQUENCY/TIME DOMAINS OF IMR 1 TO IMR 7
FOR UE2 : NOTIFIED OF THE LOCATIONS IN FREQUENCY/TIME DOMAINS OF IMR 8 TO IMR 14

FIG.9A

TABLE 1

| DCI | RATE MATCHING PATTERN |
|---|---|
| 00 | CRS AND ZP CSI-RS PATTERN OF TP0 |
| 01 | CRS AND ZP CSI-RS PATTERN OF TP1 |
| 10 | CRS AND ZP CSI-RS PATTERN OF TP2 |
| 11 | CRS AND ZP CSI-RS PATTERN OF MBSFN SUBFRAME OR NCT |

FIG.9B

TABLE 2

| SCHEDULED RESULTS | RATE MATCHING PATTERN |
|---|---|
| TP0 | CRS AND ZP CSI-RS PATTERN OF TP0 |
| TP1 | CRS AND ZP CSI-RS PATTERN OF TP1 |
| TP2 | CRS AND ZP CSI-RS PATTERN OF TP2 |
| TP0&TP1 | CRS AND ZP CSI-RS PATTERN OF MBSFN SUBFRAME OR NCT |
| TP0&TP2 | |
| TP1&TP2 | |
| TP0&TP1&TP2 | |

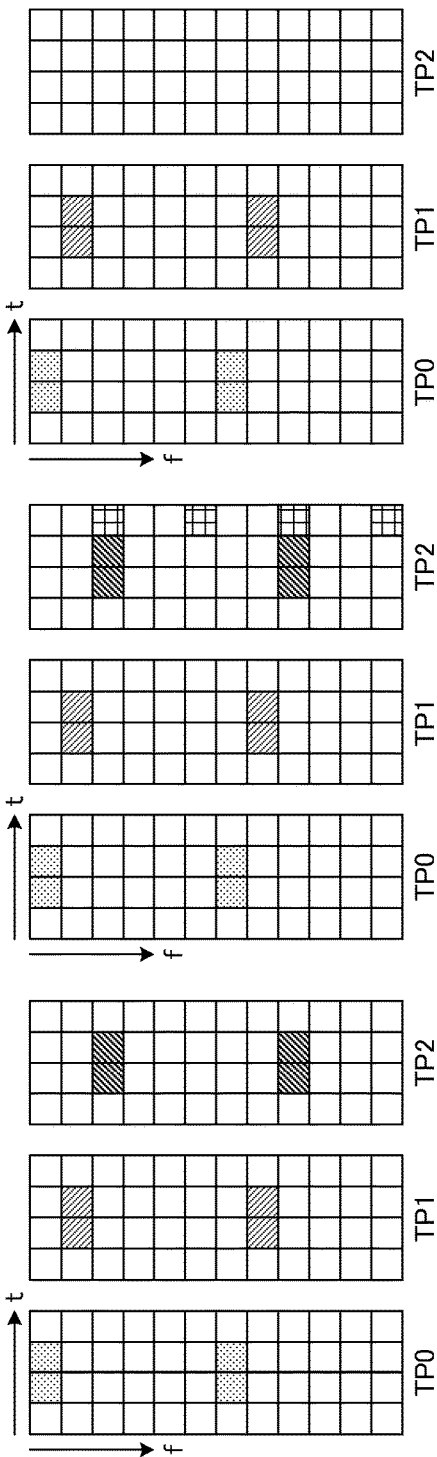

FOR UE1
 TP0 : IMR1, IMR2, IMR5, IMR7
 TP1 : IMR1, IMR3, IMR5, IMR6
 TP2 : IMR1, IMR4, IMR6, IMR7, IMR8, IMR9, IMR12, IMR14

FOR UE2
 TP2 : IMR1, IMR4, IMR6, IMR7, IMR8, IMR9, IMR12, IMR14
 TP3 : IMR8, IMR10, IMR12, IMR13
 TP4 : IMR8, IMR11, IMR13, IMR14

| DCI | RATE MATCHING PATTERN |
|---|---|
| 000 | CRS AND ZP CSI-RS PATTERN OF TP0 |
| 001 | CRS AND ZP CSI-RS PATTERN OF TP1 |
| 010 | CRS AND ZP CSI-RS PATTERN OF TP2 |
| 011 | CRS AND ZP CSI-RS PATTERN OF TP0 & TP1 |
| 100 | CRS AND ZP CSI-RS PATTERN OF TP0 & TP2 |
| 101 | CRS AND ZP CSI-RS PATTERN OF TP1 & TP2 |
| 110 | CRS AND ZP CSI-RS PATTERN OF TP0 & TP1 & TP2 |
| 111 | CRS AND ZP CSI-RS PATTERN OF MBSFN SUBFRAME OR NCT |

TABLE 1' (TOTAL 8 PATTERNS)

FIG.13

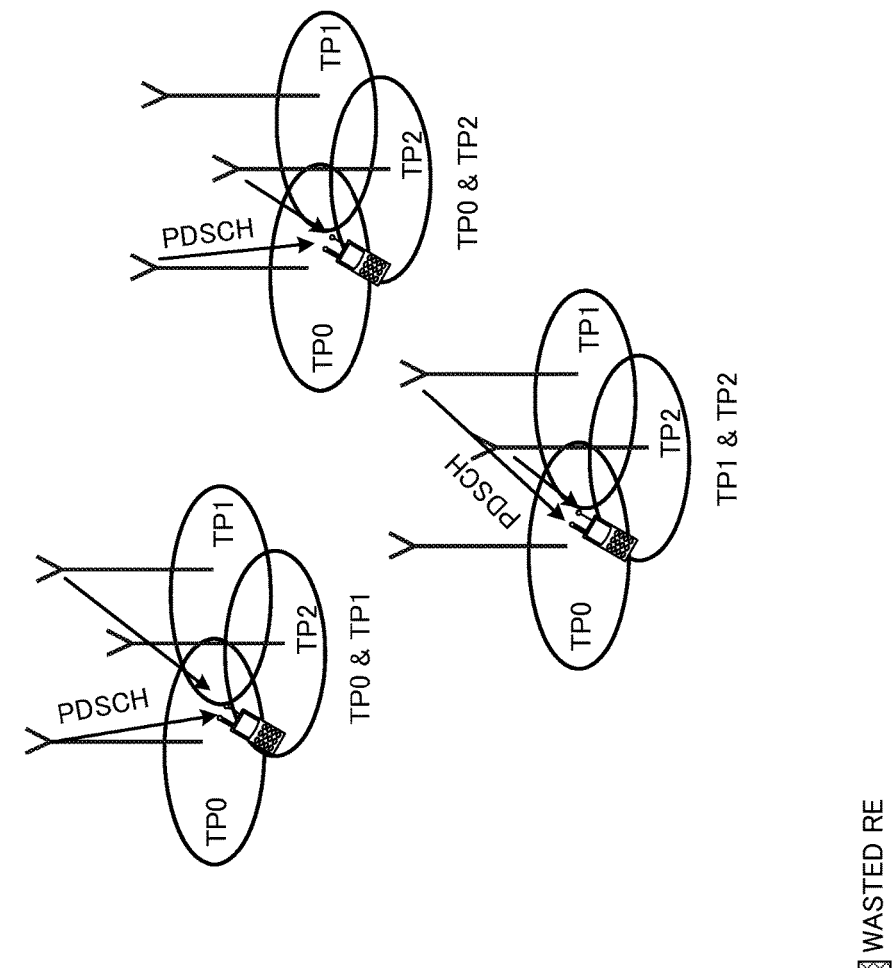
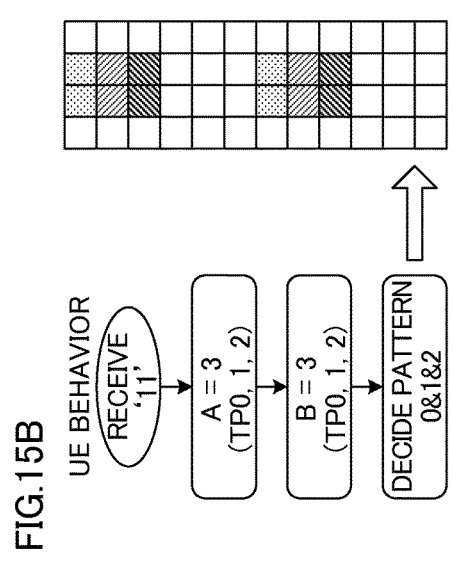
FIG.15A
FIG.15B
FIG.15C

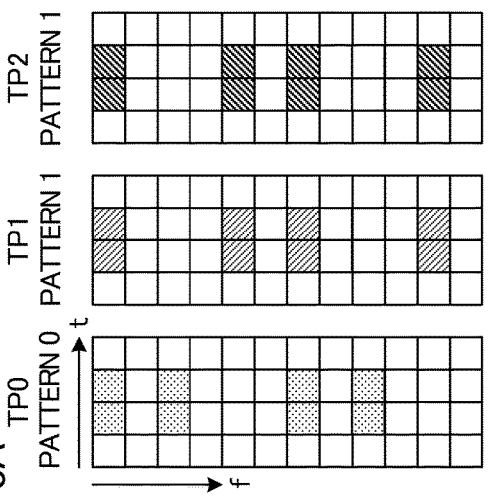
FIG.18A
FIG.18B
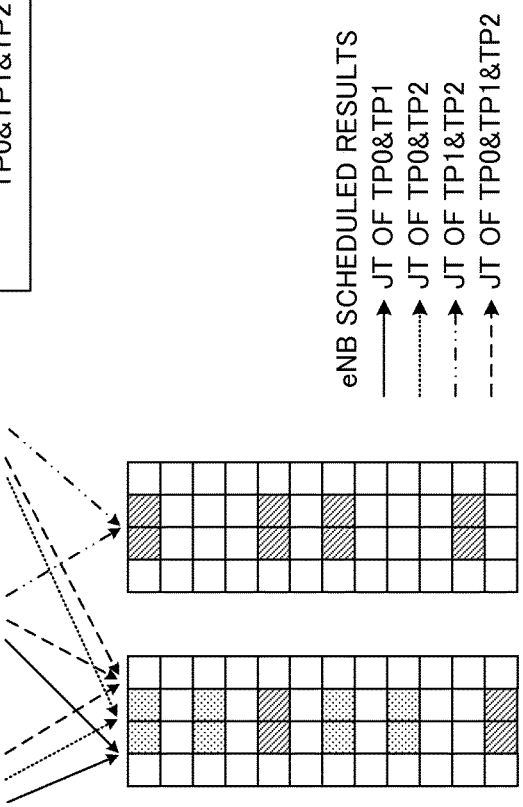
FIG.18C

RADIO COMMUNICATION SYSTEM, RADIO COMMUNICATION METHOD, USER TERMINAL AND RADIO BASE STATION

TECHNICAL FIELD

The present invention relates to a radio communication system, a radio communication method, a user terminal and a radio base station in a next-generation mobile communication system.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, LTE (Long-Term Evolution) is under study for the purposes of further increasing high-speed data rates, providing low delay, and so on (non-patent literature 1).

In a third-generation system, it is possible to achieve a transmission rate of maximum approximately 2 Mbps on the downlink by using a fixed band of approximately 5 MHz. In a system of the LTE system, it is possible to achieve a transmission rate of about maximum 300 Mbps on the downlink and about 75 Mbps on the uplink by using a variable band which ranges from 1.4 MHz to 20 MHz. In the UMTS network, successor systems to LTE are also under study for the purposes of achieving further broadbandization and higher speed (for example, which may be called LTE advanced or LTE enhancement (hereinafter referred to as "LTE-A")).

In the downlink of the LTE system (for example, Rel-8 LTE), there is defined CRS (Cell-specific Reference Signal) that is associated with a cell ID. The CRS is used to demodulate user data and also used to measure downlink channel quality (CQI: Channel Quality Indicator) for scheduling and adaptive control, and so on. In the downlink of the LTE-A system (for example, Rel-10 LTE), CSI-RS (Channel State Information-Reference Signal) is under study, as a reference signal for measuring channel state information (CSI).

CITATION LIST

Non-Patent Literature

Non-Patent Literature 1: 3GPP, TR25.912 (V7.1.0), "Feasibility study for Evolved UTRA and UTRAN", September 2006

SUMMARY OF THE INVENTION

Technical Problem

In the LTE system, there is a promising technique to improve system performance even more, called "inter-cell orthogonalization". For example, in the LTE-A system, intra-cell orthogonalization is made possible by orthogonal multiple access both on the uplink and on the downlink. That is to say, on the downlink, orthogonality is established between user terminals UE (user equipment) in the frequency domain. In the meantime, between cells, like in W-CDMA, interference randomization by one-cell frequency re-use is fundamental.

Then, in 3GPP (3rd Generation Partnership Project), Coordinated Multi-Point transmission/reception (CoMP) is under study as the technique for realizing inter-cell orthogonalization. In this CoMP technique, a plurality of cells coordinates to perform signal processing of transmission and reception for one or a plurality of user terminals. By application of this CoMP technique, improvement is expected of throughput performance particularly of a user terminal UE at a cell edge.

Thus, in the LTE-A system, in addition to the transmission mode of transmitting downlink signals (data signals, control signals, reference signals and so on) from one transmission point to a user terminal, the transmission mode of transmitting downlink signals from a plurality of transmission points to a user terminal has been considered. When downlinks signals are transmitted from a plurality of transmission points, a user terminal needs to perform rate matching to specify resources (REs) allocated with data regions (PDSCH: Physical Downlink Shared Channel).

When downlink signals are transmitted from a single transmission point, a user terminal performs rate matching in consideration of control signals (e.g., PDCCH signals) and reference signals (e.g., CRS pattern, CSI-RS pattern and so on) transmitted from a particular transmission point. On the other hand, when downlink signals are transmitted from a plurality of transmission points, a user terminal needs to perform rate matching appropriately in consideration of control signals and reference signals transmitted from the plural transmission points.

The present invention was carried out in view of the foregoing and aims to provide a radio communication system, a user terminal, a radio base station and a radio communication method that are capable of performing rate matching appropriately even when downlink signals are transmitted from a plurality of transmission points to a user terminal.

Solution to Problem

The present invention provides a radio communication system comprising: a plurality of radio base stations; and a user terminal that is configured to be able to perform coordinate multi-point transmission and reception with the plurality of radio base stations, wherein each of the radio base stations has: a transmission section that transmits downlink control information including bit information defining a predetermined rate matching pattern to the user terminal, the user terminal has: a reception section that receives the downlink control information; and a processing section that performs rate matching based on the bit information defining the rate matching pattern, the rate matching pattern comprises a combination of a cell-specific reference signal pattern and an interference measurement reference signal pattern used where transmission is performed from a plurality of radio base stations each using an MBSFN subframe or new carrier type, the combination being aggregated in predetermined bits, and the processing section performs the rate matching based on a subframe configuration and the interference measurement reference signal pattern of the radio base station.

Technical Advantage of the Invention

According to the present invention, it is possible to perform rate matching appropriately even when downlink signals are transmitted from a plurality of transmission points to a user terminal.

BRIEF DESCRIPTION OF THE DRAWINGS

FIG. 2 provides diagrams each illustrating an example of mapping of CRSs (CRS pattern) transmitted from each transmission point using normal subframes;

FIG. 4 provides diagrams illustrating relationship between rate matching patterns (CRS patterns) corresponding to scheduling results and bit information (DCI);

FIG. 9 provides diagrams illustrating relationship between rate matching patterns (CRS patterns and ZP CSI-RS patterns) corresponding to scheduling results and bit information (DCI);

FIG. 11 provides diagrams each illustrating an example of the rate matching procedure performed by the user terminal;

FIG. 13 is a diagram illustrating relationship between rate matching patterns (CRS patterns and ZP CSI-RS patterns and bit information (in 3 bits);

FIG. 15 provides diagrams for explaining the case where a part of transmission points is selectively scheduled among transmission points that constitute a CoMP set;

FIG. 18 provides diagrams for explaining rate matching in the case where two ZP CSI-RS patterns are applied to three transmission points (TP 0, TP 1 and TP 2);

DESCRIPTION OF EMBODIMENTS

With reference to the attached drawings, embodiments of the present invention will be described in detail below.

First description is made about downlink CoMP (Coordinated Multi-Point) transmission. Downlink CoMP transmission includes Coordinated Scheduling/Coordinated Beamforming (CS/CB) and Joint processing. Coordinated Scheduling/Coordinated Beamforming is a method of transmitting a shared data channel (PDSCH: Physical Downlink Shared Channel) only from one transmission/reception point (or radio base station, cell) to a user terminal UE, in which method, allocation of radio resources in frequency/space domains is performed in consideration of interference from other transmission/reception points and interference to other transmission/reception points.

Figure 1A:
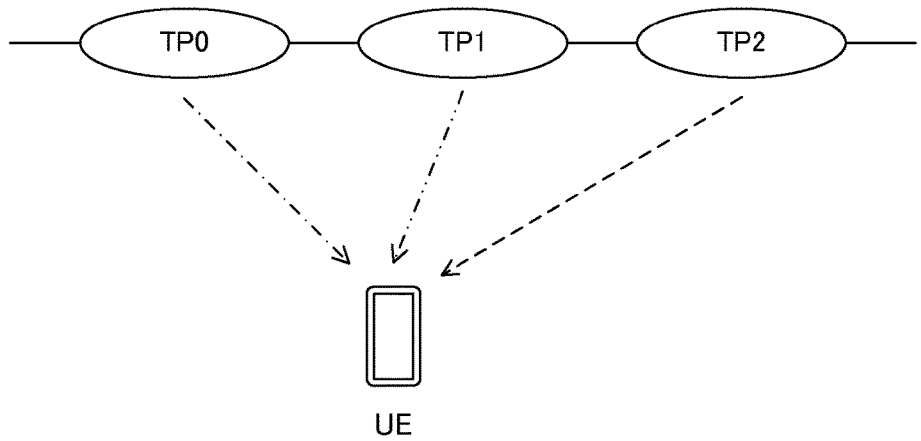
FIG. 1 provides diagrams each for explaining coordinate multi-point transmission.
Figure 1B:
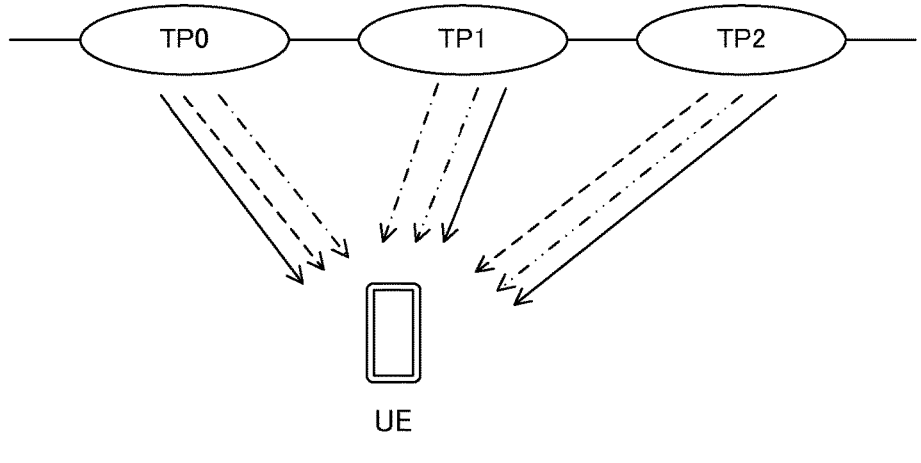

On the other hand, Joint processing is a method of transmitting shared data channels simultaneously from a plurality of transmission/reception points (here, three transmission/reception points of TP 0, TP 1 and TP 2), using precoding, as illustrated in FIG. 1. Specifically, Joint processing includes Dynamic Point Selection (DPS) which is a method of selecting one from a plurality of transmission/reception points (here, three transmission/reception points of TP 0, TP 1 and TP 2) instantaneously to transmit a shared data channel as illustrated in FIG. 1A and a Joint Transmission (JT) which is a method of transmitting shared data channels from a plurality of transmission/reception points to one user terminal UE as illustrated in FIG. 1B. Network selects one or a plurality of transmission/reception transmission points (radio base stations) dynamically to transmit data signals to a user terminal.

For example, in DPS CoMP as illustrated in FIG. 1A, the radio base station eNb transmits a data signal from the transmission point TP 0 to a user terminal in subframe #1 and the radio base station eNb transmits a data signal from the transmission point TP 1 to the user terminal in subframe #2, and the radio base station eNb transmits a data signal from the transmission point TP 2 to the user terminal in subframe #3. On the other hand, in JT CoMP as illustrated in FIG. 1B, it may be configured that the radio base stations eNb transmit data signals to a user terminal from the transmission points TP 0 and TP 1 in subframe #1, the radio base stations eNb transmit data signals to the user terminal from the transmission points TP 1 and TP 2 in subframe #2, the radio base stations eNb transmit data signals to the user terminal from the transmission points TP 0 and TP 2 in subframe #3, and the radio base stations eNb transmit data signals to the user terminal from the transmission points TP 0, TP 1 and TP 2 in subframe #4.

Next description is made about rate matching performed when a user terminal receives data signals transmitted from a plurality of transmission points. FIGS. 2A to 2C each illustrate an example of mapping pattern of downlink signals transmitted from a plurality of transmission points (e.g., TP 0, TP 1, TP 2) as a CoMP set in a certain subframe. Here, the mapping patterns shown in FIGS. 2A to 2C are of normal subframes. FIG. 2D illustrates a mapping pattern in consideration of control signals and reference signals (CRSs) which are transmitted from TP 0 and TP 1 where JT CoMP is applied to TP 0 and TP 1.

In the mapping pattern of downlink signals transmitted from each transmission point, a first predetermined number of OFDM symbols (maximum 3 OFDM symbols) in a subframe are allocated with downlink control channels (PDCCH) and the like. Besides, in the mapping pattern of downlink signals transmitted from each transmission point includes cell-specific reference signals (CRSs). CRSs are mapped to different resources in such a manner as to be orthogonal between different antenna ports in each transmission point by time division multiplexing (TDM)/frequency division multiplexing (FDM) and to be displaced by shifting in the frequency direction from one transmission point to another.

In addition, in radio resources following the predetermined symbols allocated with the downlink control channels, downlink shared data channel (PDSCH) are mapped to a resource region excluding the resources mapped with CRSs.

Accordingly, the user terminal performs rate matching on downlink signals transmitted from the plural transmission points in consideration of resources allocated with PDCCH, CRS and so on thereby to be able to specify resources for PDSCH. For example, in FIG. 2D, the user terminal performs rate matching based on allocation patterns of PDCCH and CRS in TP 0 and TP 1 thereby to be able to specify resources for PDSCH.

In the above-mentioned normal subframes, CRSs are mapped to all over the frequency band. On the other hand, as the subframe configuration, MBSFN (Multimedia Broadcast Multicast service Single Frequency Network) subframe and NCT (New Carrier Type) configurations are considered to be used.

MBSFN is a scheme in which a plurality of radio base stations that constitute MBSFN transmit same signals simultaneously so that a user terminal can perform RF (Radio Frequency) combining on the signals transmitted from the radio base stations. The MBSFN subframe is a subframe in which sections other than those for control channels are made blank (blank periods) and CRS is not allocated to the PDSCH region. In the following description, the pattern in which CRS is not allocated to the PDSCH region may be called CRS pattern of MBSFN subframe.

Figure 3A:
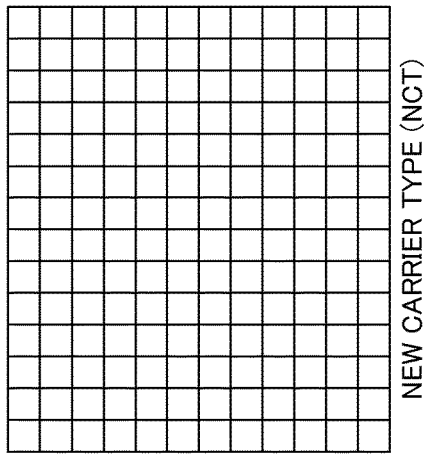
FIG. 3 provides diagrams each illustrating an example of mapping of CRSs (CRS pattern) transmitted from each transmission point using MBSFN subframes (or NCT)
Figure 3B:
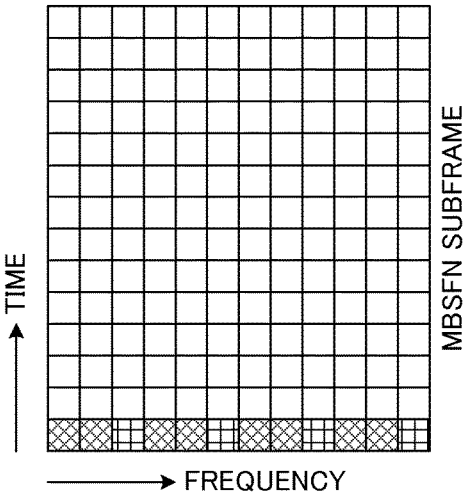
Figure 3C:
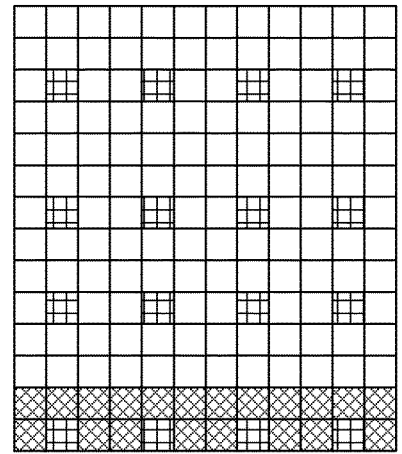

NCT (also called "Extension carrier type") subframe is a subframe in which existing PDCCH of first predetermined number of OFDM symbols (maximum 3 OFDM symbols) is not provided and CRS is also not allocated, as illustrated in FIG. 3B.

For example, in a certain subframe, when scheduling is performed to perform data transmission from TP 1 and TP 2 to the user terminal, the user terminal performs rate matching in consideration of the CRS patterns of TP 1 and TP 2 and so on. When TP 1 uses normal subframes (see FIG. 2B) and TP 2 uses MBSFN subframes (or NCT) (see FIGS. 3A and 3B), the CRS pattern is not in the PDSCH region of TP 2 and the rate matching pattern becomes identical to the mapping pattern of TP 1. That is, the user terminal is able to perform rate matching only in consideration of the mapping pattern of TP 1 using normal subframes.

Next description is made about a specific method for the user terminal to receive downlink signals from a plurality of transmission points and perform CRS rate matching, with reference to FIGS. 4 and 5.

First, the user terminal receives CRS patterns of transmission points that form a CoMP set from a predetermined transmission point (serving cell) or the respective transmission points. For example, the predetermined transmission point (radio base station as a serving cell) or the transmission points notify the user terminal of the CRS patterns of the respective transmission points by higher layer signaling (e.g. RRC signaling) semi-statically.

For example, the radio base station notifies the user terminal of the number of CRS ports, CRS frequency shift, MBSFN subframe (or NCT), subframe offset and the like. When the number of CRS ports is 0, it shows that the CRS pattern is a CRS pattern of MBSFN subframe (or NCT).

Further, the user terminal receives bit information (bit information indicating a specific CRS pattern) that defines which CRS pattern to use as a rate matching pattern in each subframe from the predetermined transmission point (serving cell) or each transmission point. For example, the radio base station notifies the user terminal of bit information indicating a predetermined rate matching pattern by including the bit information in DCI (Downlink Control Information) and by dynamically signaling. The radio base station, for example, notifies the user terminal of a predetermined rate matching pattern using bit information of two bits.

FIG. 4A illustrates an example of table defining relationship between 2-bit bit information included in DCI (DCI signaling) and predetermined CRS patterns applied to rate matching (rate matching patterns). Besides, FIG. 4B illustrates an example of table defining relationship between scheduling results by the radio base station (or higher network) and rate matching patterns to notify the user terminal of. It may be configured that the table 1 shown in FIG. 4A is held by the user terminal and the radio base station and the table 2 shown in FIG. 4B is held at least by the radio base station.

The radio base station determines, based on a scheduling result, a rate matching pattern (CRS pattern) for the user terminal to use in rate matching referring to the table 2 and notifies the user terminal of downlink control information (DCI) including its corresponding bit information. The user terminal selects the rate matching pattern (CRS pattern) to apply to the rate matching, based on the bit information included in the downlink control information (DCI).

As the 2-bit bit information, the respective CRS patterns for the three transmission points (TP 0, TP 1, TP 2) and the CRS pattern of MBSFN subframe (or NCT) can be defined. Here, as the CRS pattern of MBSFN subframe, a combination of rate matching patterns of the transmission points in JT CoMP can be defined into predetermined bit information (here, one bit information piece "11").

Figure 5A:
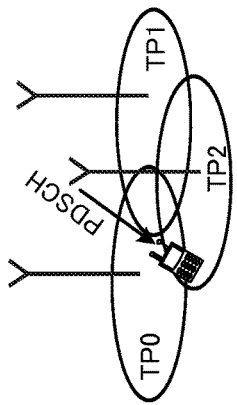
FIG. 5 provides diagrams each illustrating an example of correspondence between scheduling results and rate matching patterns.
Figure 5B:
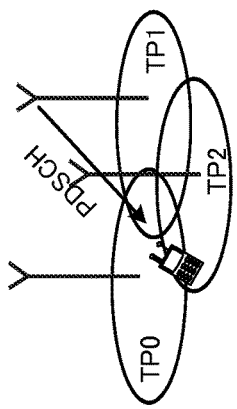
Figure 5C:
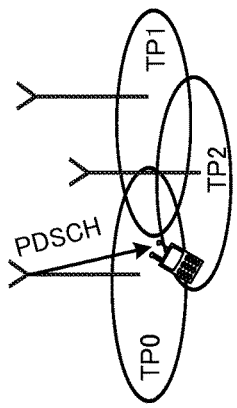

For example, FIG. 5A illustrates a scheduling result in a certain subframe in which a data signal is transmitted from TP 0 to the user terminal (e.g., normal subframe). In this case, the radio base station notifies the user terminal of DCI including the CRS pattern of TP 0 (bit information "00") as the rate matching pattern. In addition, FIG. 5B illustrates a scheduling result in a certain subframe in which a data signal is transmitted from TP 1 to the user terminal. In this case, the radio base station notifies the user terminal of DCI including the CRS pattern of TP 1 (bit information "01") as the rate matching pattern. Besides, FIG. 5C illustrates a scheduling result in a certain subframe in which a data signal is transmitted from TP 2 to the user terminal. In this case, the radio base station notifies the user terminal of DCI including the CRS pattern of TP 2 (bit information "10") as the rate matching pattern.

Figure 6:
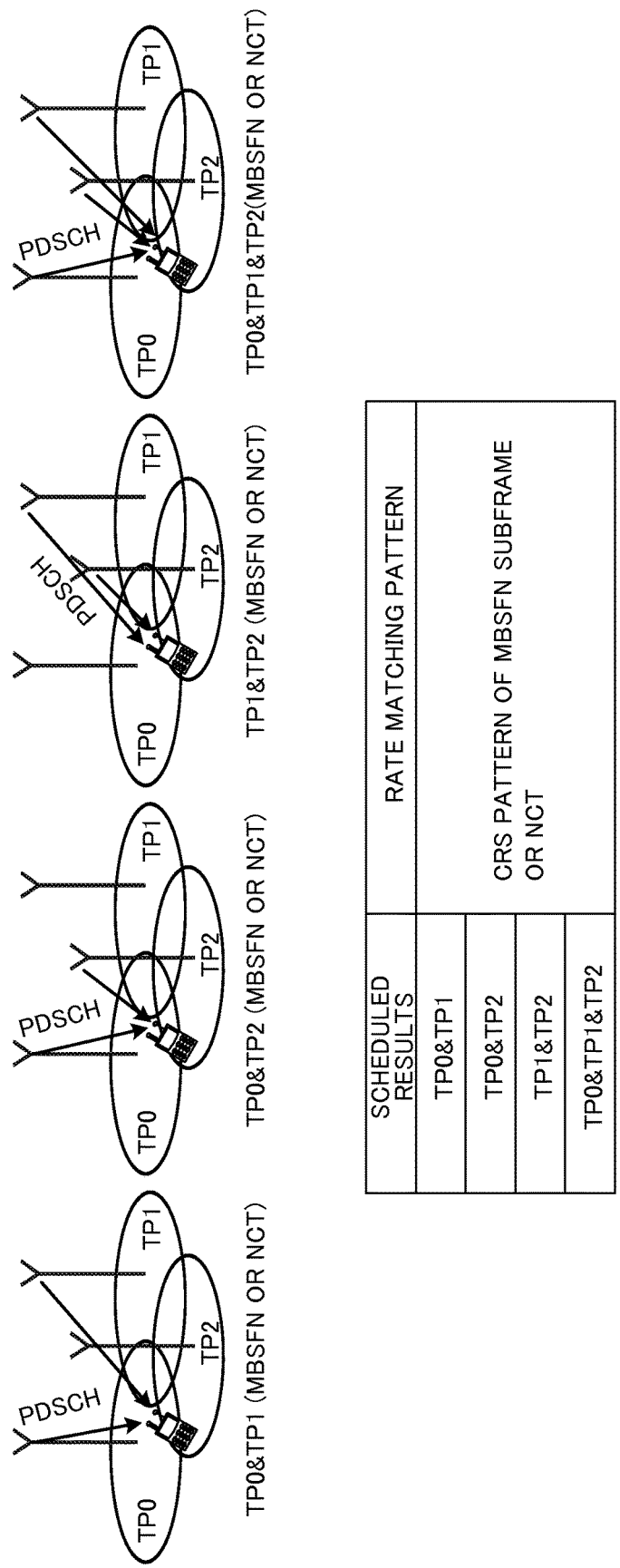
FIG. 6 is a diagram illustrating another example of correspondence between scheduling results and rate matching patterns.

Further, FIG. 6 illustrates a scheduling result in a certain subframe in which data signals are transmitted from at least two of TP 0, TP 1 and TP 2 to the user terminal using MBSFN subframes (or NCT) (JT CoMP). In this case, the radio base station notifies the user terminal of DCI including the CRS pattern of MBSFN subframe (or NCT) (bit information "11") as the rate matching pattern.

As illustrated in FIG. 6, when the plural transmission points apply MBSFN subframes (or NCT) in JT CoMP, CRS is not mapped to the PDSCH region. Therefore, the rata matching patterns of the plural transmission points can be represented in one bit information piece (here, "11"). With this structure, it is possible to reduce the number of bits to be included in downlink control information. Further, when receiving the bit information "11", the user terminal understands that no CRS is mapped to symbols following the first predetermined number of OFDM symbols (OFDM symbols allocated with PDCCH) in a subframe, thereby to be able to perform rate matching.

By the way, when CoMP transmission is applied, the user terminal generates CSI (Channel State Information) based on a channel state measurement reference signal (CSI-RS) transmitted from each of transmission points and feeds it back to the radio base station as a serving cell.

CSI-RS is a reference signal to use for CSI measurement of CQI (Channel Quality Indicator), PMI (Precoding Matrix Indicator), RI (Rank Indicator) and the like as a channel state. CSI-RS is allocated to radio resources at predetermined intervals (e.g., 10-subframe cycle) and is different from CRS which is allocated to all subframes. In addition, the CSI-RS is specified by parameters "position", "sequence" and "transmission power". The position of CSI-RS includes a subframe offset, cycle, subcarrier-symbol offset.

When measuring a channel state using a CSI-RS, it is important to consider an influence of interference from other transmission points (other cells). Then, study has been made of estimation of interference from other transmission points using CSI-RS (interference measurement (estimation) reference signal) to use in power estimation of an interference signal. As an interference measurement reference signal, zero power CSI-RS (ZP CSI-RS) has been considered to be used. In zero power CSI-RS, transmission power is not allocated to a resource to which the CSI-RS is allocated (CSI-RS is muted). In the following description, ZP CSI-RS is described as an example of interference measurement reference signal, however, the interference measurement (estimation) reference signal of the present embodiment is not limited to ZP CSI-RS.

Figure 7:
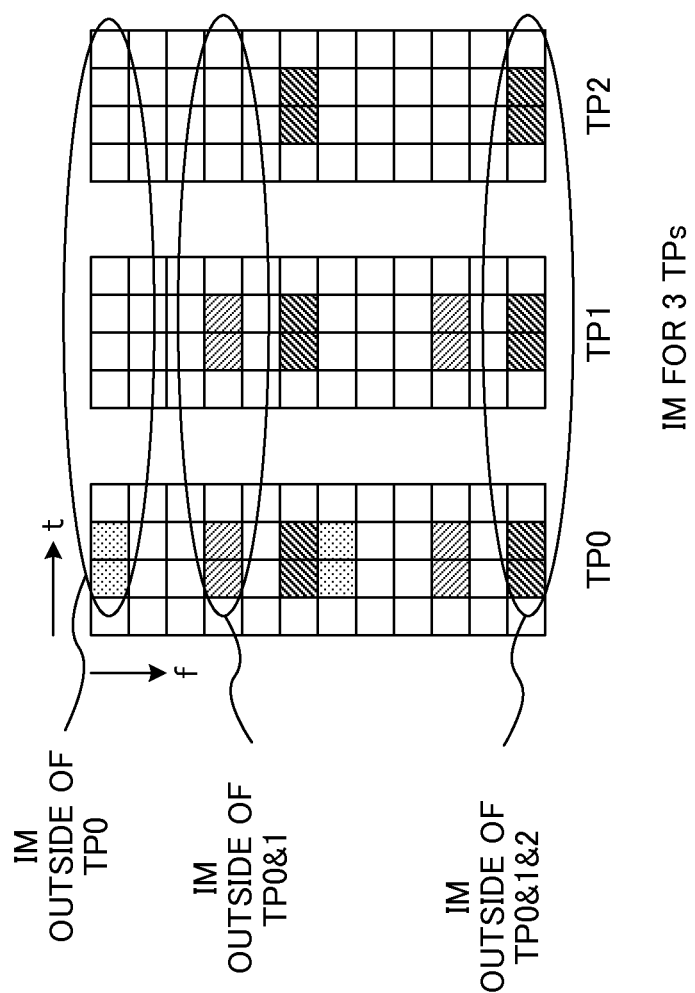
FIG. 7 is a diagram illustrating transmission of interference measurement reference signals (ZP CSI-RSs) from a plurality of transmission points (TP 0, TP 1 and TP 2) as a CoMP set.

FIG. 7 illustrates the case where interference measurement reference signals are transmitted from TP 0, TP 1 and TP 2 as a CoMP set to the user terminal. FIG. 7 illustrates an example of allocation pattern of interference measurement CSI-RSs (ZP CSI-RSs), and the interference measurement CSI-RSs are allocated to resources (IMR: Interference Measurement Resource) to use for measurement of interference signals. Here, in FIG. 7, IMR patterns (CSI-RS patterns) in each of which predetermined symbols (for example, eight to eleventh symbols) are extracted from 1 PRB pair are shown by way of example, however, the present embodiment is not limited to this.

In addition, the interference measurement CSI-RSs are allocated in such a manner as not to overlap control signals allocated to PDCCH, data signals allocated to PDSCH, CRSs and other signals in a subframe defined in LTE. Further, in view of PAPR prevention, resources to which interference measurement CSI-RSs are allocatable are provided a set of two resource elements (REs) adjacent in the time axis direction.

For example, in the plural transmission points (TP 1, TP 2, TP 3) as a CoMP set, IMR (zero power CSI-RS) configured only for TP 0 is used to be able to measure interference other than TP 0. In addition, IMR configured for TP 0 and TP 1 is used thereby to be able to measure interference other than TP 0 and TP 1. Likewise, IMR configured for TP 0, TP 1 and TP 2 is used thereby to be able to measure interference other than TP 0, TP 1 ad TP 2. Here, the position (position in the frequency-time domain) of an interference measurement reference signal (ZP CSI-RS) to map to a radio resource can be determined based on the IMR configuration given from the radio base station. Here, the IMR configuration is sent by higher layer signaling (e.g., RRC signaling) before CoMP scheduling.

Figure 8A:
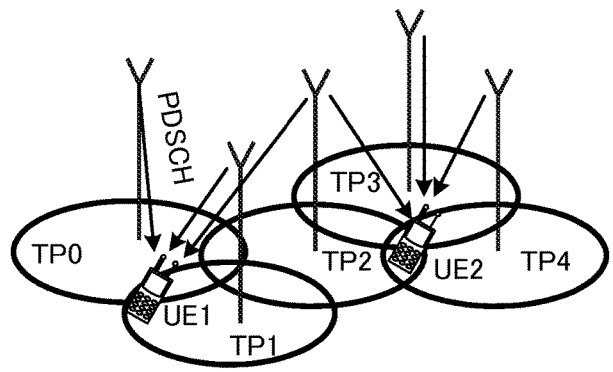
FIG. 8 provides diagrams illustrating IMR configurations of which the radio base station notifies the user terminal.
Figure 8B:
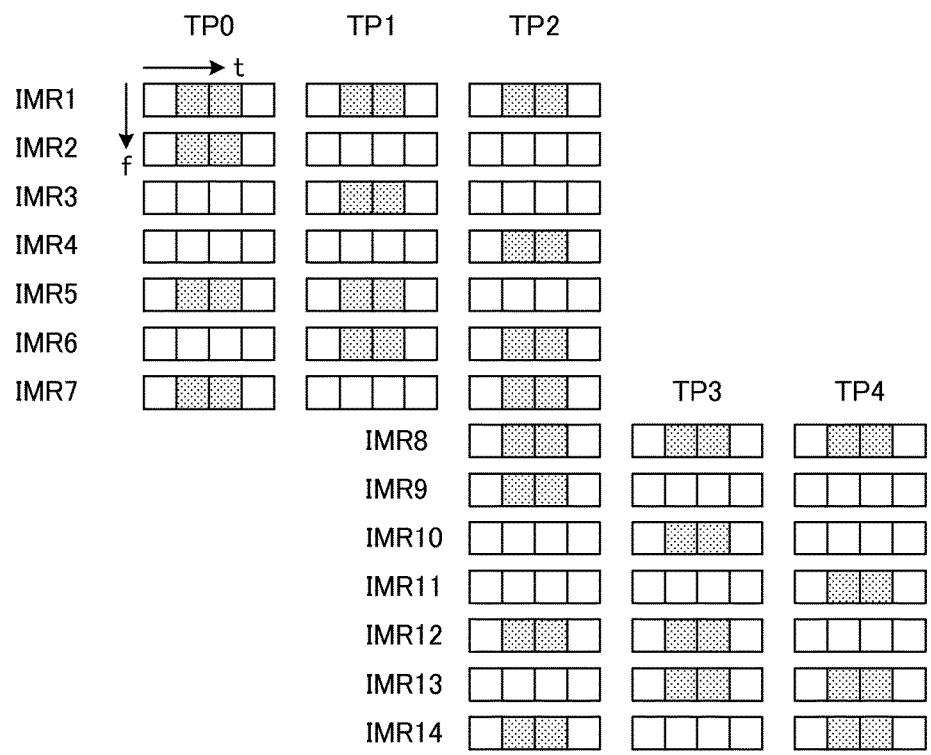

FIG. 8 illustrates the IMR configurations of which the radio base station notifies the user terminal. In the plural IMR configurations shown in FIG. 8B (here, IMRs 1 to 14), the positions in the frequency-time domain of IMRs (mapped ZP CSI-RSs) configured for respective transmission points are different from each other. The user terminal is able to determine a ZP CSI-RS pattern based on a predetermined IMR configuration given from the radio base station by higher layer signaling (e.g., RRC signaling).

In FIG. 8A, data signals are transmitted from a CoMP set of TP 0, TP 1 and TP 2 to the user terminal (UE 1) and also, data signals are transmitted from a CoMP set of TP 2, TP 3 and TP 4 to the user terminal (UE 2).

In this case, the radio base station notifies the user terminal (UE 1) of the positions in frequency-time domains of ZP CSI-RSs mapped in IMR configurations 1 to 7 and also notifies the user terminal (UE 2) of the positions in frequency-time domains of ZP CSI-RSs mapped in IMR configurations 8 to 14. In this case, the IMR configurations are configured individually for the respective transmission points.

Here, the CSI-RS pattern applied to rate matching is also associated with bit information, like the CRS pattern, as illustrated in FIG. 4 above, and the bit information is sent to the user terminal based on a scheduling result. That is, the user terminal may be configured to receive bit information which indicates which ZP CSI-RS pattern to use as rate matching pattern for each subframe and perform rate matching. In this case, the user terminal receives resource information of zero-power CSI-RSs of each transmission point (IMR configuration) and so on by higher layer signaling and also receives downlink control information (DCI) including a predetermined CSI-RS pattern to apply to rate matching.

Further, in this case, the bit information indicative of a rate matching pattern may be defined as a combination of a CRS pattern and a ZP CSI-RS pattern. For example, as illustrated in FIG. 9A, a CRS pattern of each transmission point and a CSI-RS pattern are combined to be defined as 2-bit information. Thus, as the structure of the rate matching pattern of CRSs as illustrated in FIG. 4 above is used to define the CRS pattern in combination with the ZP CSI-RS pattern, it is possible to prevent an increase in bit number.

Besides, FIG. 9B illustrates relationship between scheduling results and rate matching patterns, which is defined like in FIG. 4B above. In this case, combinations of the CRS pattern of the MBSFN subframe (or NCT) and the ZP CSI-RS pattern of any of transmission points in JT CoMP are defined as a rate matching pattern of one bit information piece (here, "11").

However, unlike CRSs, ZP CSI-RSs are sometimes mapped to different resources for different transmission points in the PDSCH region even in the case of an MBSFN subframe (or NCT). Therefore, when the radio base station notifies the user terminal of the CRS pattern of MBSFN subframe (or NCT) and the ZP CSI-RS pattern (bit information "11" in FIG. 9) as a rate matching pattern, the user terminal is not able to specify the ZP CSI-RS pattern, unlike in the case of using only the CRS pattern. That is, the user terminal may not be able to determine of which transmission point the ZP CSI-RS pattern is applied to the rate matching.

Figure 10B:
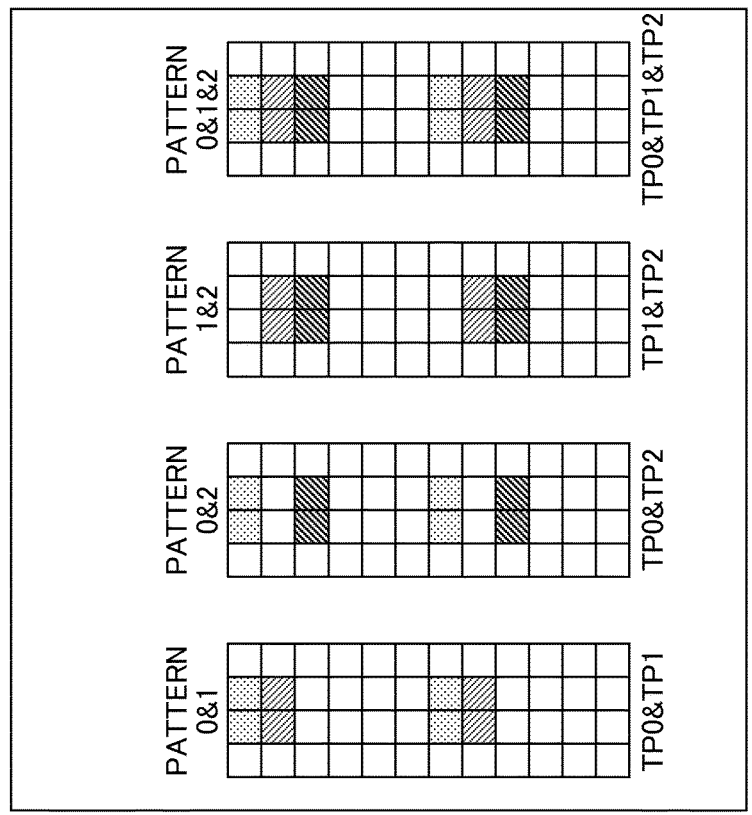
FIG. 10 provides diagrams illustrating ZP CSI-RS patterns of transmission points each using an MBSFN subframe in a certain subframe.
Figure 10A:
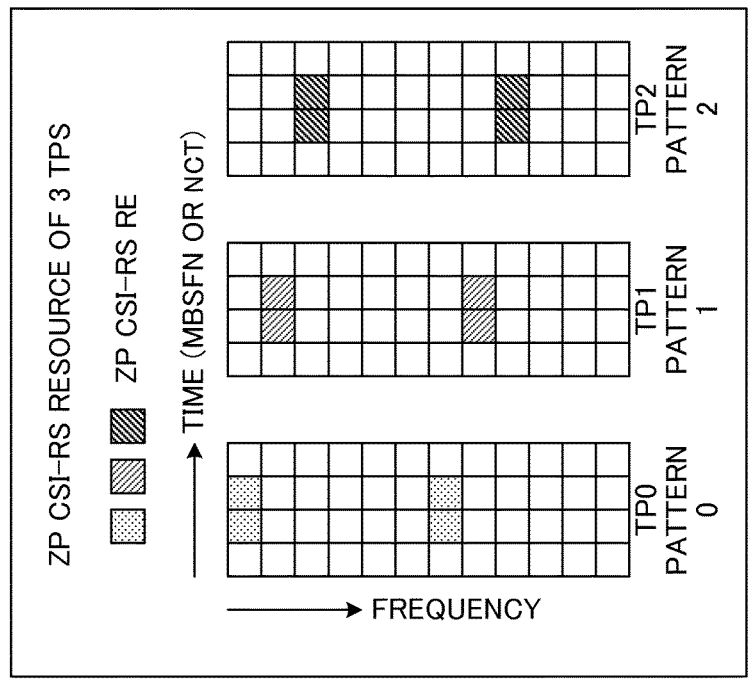

For example, as illustrated in FIG. 10A, when in a certain subframe, ZP CSI-RSs in respective transmission points using MBSFN are mapped to different resources, there are considered four combinations of ZP CSI-RS patterns of the transmission points as shown in FIG. 10B. In FIG. 10B, the four combinations of the ZP CSI-RSs are a combination of TP 0 and TP 1, a combination of TP 0 and TP 2, a combination of TP 1 and TP 2, and a combination of TP 0, TP 1 and TP 2.

In this case, even when the radio base station notifies the user terminal of the CRS pattern of MBSFN subframe (or NCT) and the ZP CSI-RS pattern (bit information "11" in FIG. 9) as a rate matching pattern, the user terminal is not able to specify which ZP CSI-RS pattern in FIG. 10B to apply to rate matching.

Then, the present inventors have reached the idea that when data signals are transmitted from a plurality of transmission points, a user terminal determines a CRS pattern in consideration of each rate matching pattern sent from a radio base station as well as a subframe configuration used in each of the transmission points and also the user terminal determines a CSI-RS pattern for a transmission point using MBSFN subframes (or NCT). They have found that this structure makes it possible to prevent an increase in number of bits of DCI indicative of a rate matching pattern and also to perform rate matching appropriately. The following description is specifically made about rate matching in the user terminal.

First Embodiment

When in a certain subframe, data signals are transmitted from a plurality of transmission points using MBSFN subframes (or NCT) (bit information "11" in FIG. 9 above), the user terminal determines a rate matching pattern in consideration of the ZP CSI-RS patterns of the respective transmission points. For example, the user terminal is able to perform rate matching based on the following procedure.
<Step 1>
The user terminal checks the subframe configurations of all the transmission points in a certain subframe. To be more specific, the user terminal determines whether each of the transmission points that form a CoMP set uses an MBSFN subframe (or NCT) or a normal subframe. Then, the user terminal determines the number (A) of transmission points each using an MBSFN subframe (or NCT) in the subframe. Here, the user terminal is able to make determination about the subframe configuration based on information sent in advance by higher layer signaling (e.g., RRC signaling).
<Step 2>
Next, the user terminal checks a ZP CSI-RS pattern of each of the A transmission points each using an MBSFN subframe (or NCT) specified in Step 1. Then, the user terminal determines the number (B) of ZP CSI-RS patterns of the A transmission points. In this case, the number B of ZP CSI-RS patterns is equal to or less than the number (A) of transmission points using MBSFN subframes (or NCT) (B≤A).

<Step 3>
Then, the user terminal performs rate matching in the subframe in consideration of the B ZP CSI-RS patterns determined in Step 2. This makes it possible to perform rate matching appropriately even when scheduling information in the case where data signals are transmitted from a plurality of transmission points using MBSFN subframes (or NCT) (JT CoMP) is all defined as predetermined bit information (e.g., "11"), The following description is made specifically about an application example of the above-descried rate matching procedure, with reference to FIG. 11. FIG. 11 illustrates the case where different ZP CSI-RS patterns are transmitted from the transmission points.

FIG. 11A illustrates the case where ZP CSI-RSs are mapped to different resources in the respective transmission points and all the transmission points (here, TP 0, TP 1, TP 2) use MBSFN subframes (or NCT). First, the user terminal checks the subframe configuration of each of the transmission points, specifies each transmission point using an MBSFN subframe (or NCT) and determines the number (A) of transmission points (Step 1). Here, A=3 (TP 0, TP 1, TP 2).

Then, the user terminal checks a ZP CSI-RS pattern of each of the transmission points using MBSFN subframes (or NCT). In TP 0, TP 1 and TP 2, ZP CSI-RSs are mapped to mutually different resources, and therefore, the user terminal determines the number (B) of ZP CSI-RS patterns of TP 0, TP 1 and TP 2 (Step 2). Here, B=3 (TP 0, TP 1, TP 2).

The user terminal performs rate matching in consideration of the ZP CSI-RS patterns in TP 0, TP 1 and TP 2 (Step 3). The subframe configuration and the ZP CSI-RS pattern (IMR configuration) of each of the transmission points and so on are signaled from the radio base station by higher layer signaling (e.g., RRC signaling).

FIG. 11B illustrates the case where in the transmission points, ZP CSI-RSs are mapped to mutually different resources, two of the transmission points (here, TP 0 and TP 1) use MBSFN subframes (or NCT) and the other transmission point (here, TP 2) uses a normal subframe. For example, there may be configured a scheduling result showing application of JT CoMP using TP 0 and TP 1.

First, the user terminal checks the subframe configuration of each of the transmission points, specifies transmission points using MBSFN subframes (or NCT) and determines the number (A) of such transmission points (Step 1). Here, A=2 (TP 0, TP 1).

Next, the user terminal checks ZP CSI-RS patterns of each of the transmission points using MBSFN subframes (or NCT). In TP 0 and TP 1, ZP CSI-RSs are mapped to different resources, and therefore, the user terminal determines the number of ZP CSI-RS patterns is 2 (B=2) (Step 2).

Then, the user terminal performs rate matching in consideration of the ZP CSI-RS patterns in TP 0 and TP 1 (Step 3).

FIG. 11C illustrates the case where in some of the transmission points (here, TP 0 and TP 1), ZP CSI-RSs are mapped to mutually different resources, all the transmission points (here, TP 0, TP 1 and TP 2) use MBSFN subframes (or NCT). First, the user terminal checks the subframe configuration of each of the transmission points and determines the number (A) of transmission points using MBSFN subframes (or NCT) (Step 1). Here, A=3 (TP 0, TP 1 and TP 2).

Next, the user terminal checks a ZP CSI-RS pattern of each of the transmission points using MBSFN subframes (or NCT). In TP 0 and TP 1, ZP CSI-RSs are mapped to different resources and in TP 2, no ZP CSI-RS is mapped. Therefore, the user terminal determines the number of ZP CSI-RS patterns is 2 (B=2) (Step 2)

Then, the user terminal performs rate matching in consideration of the ZP CSI-RS patterns in TP 0 and TP 1 (Step 3). With this structure, even when the transmission points use mutually different CSI-RS patterns, the user terminal is able to perform rate matching appropriately.

Thus, even when the user terminal has received bit information "11" shown in FIG. 9, the user terminal is able to perform rate matching appropriately by considering the subframe configuration of each transmission point and the ZP CSI-RS pattern of each transmission point using an MBSFN subframe (or NCT).

Figure 12A:
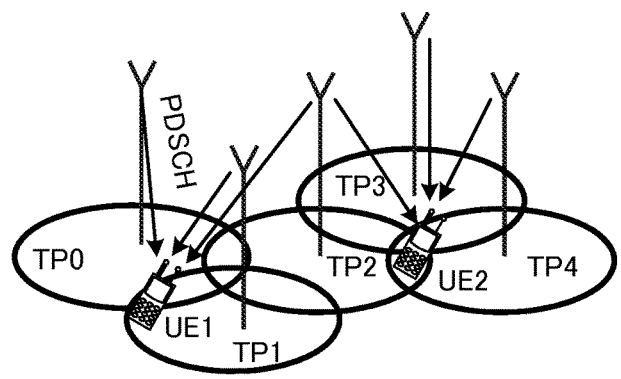
FIG. 12 provides diagrams illustrating IMR configurations of which the radio base station notifies the user terminal.
Figure 12B:
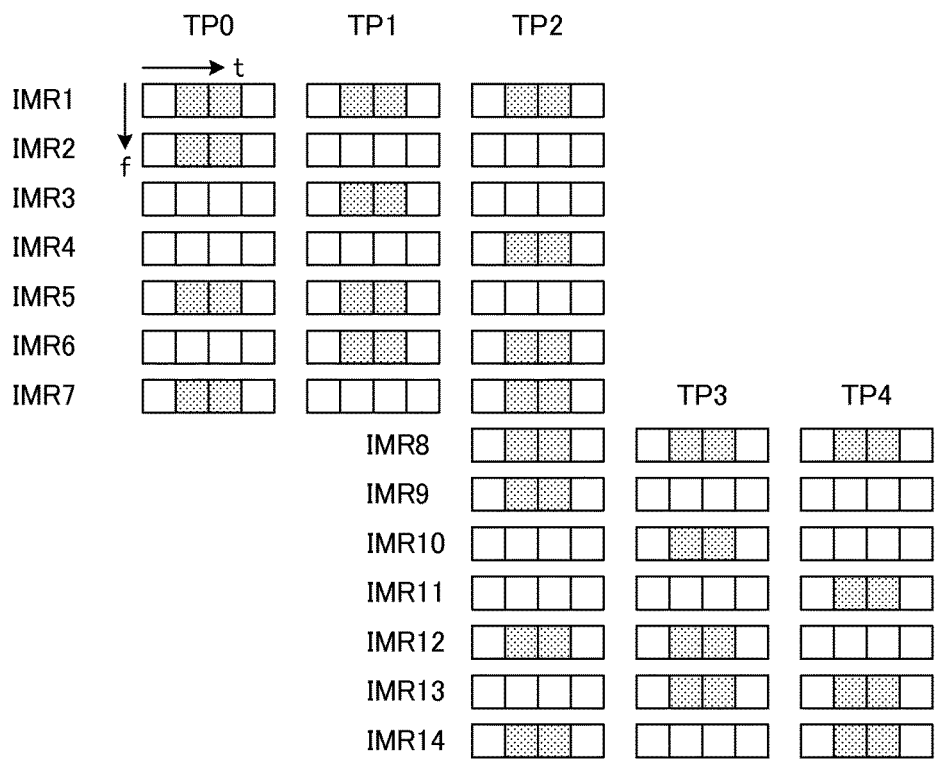

Here, in the present embodiment, the IMR configuration of which the radio base station notifies the user terminal is a resource structure of interference measurement reference signals of each radio base station performing coordinate multi-point transmission, which is signaled to the user terminal by higher layer signaling (see FIGS. 12A and 12B). In other words, in FIG. 8 mentioned above, the user terminal is notified of the ZP CSI-RS pattern for interference measurement (only positional information of ZP CSI-RSs applied to interference measurement by the user terminal), however, in FIG. 12, the user terminal is notified of the rate matching pattern of the user terminal (relationship between transmission points and IMR configurations). With this structure, as compared with the case of FIG. 8 mentioned above, it is possible to perform rate matching in a data region in consideration of interference measurement resources, thereby making it possible to perform effective rate matching.

Second Embodiment

The user terminal is also able to perform rate matching using a different method from the method described in the first embodiment above, in accordance with the bit information indicative of a rate matching pattern included in downlink control information. For example, when patterns of one transmission point are used as a rate matching pattern (bit information "00", "01" and "10" in FIG. 9A), the following rate matching procedure may be applied. As illustrated in FIG. 13, when the rate matching pattern is defined as 3-bit bit information, the following rate matching procedure may be applied to the bit information "000", "001", "010", "011", "100", "101" and "110". As for the bit information "111" in FIG. 13, the above-mentioned first embodiment is able to be applied.
<Step 1>

When the user terminal receives bit information (DCI) indicating predetermined transmission points (e.g., any of TP 0, TP 1, TP 2, TP 0+TP 1, TP 0+TP 2, TP 1+TP 2, and TP 0+TP 1+TP 2) as rate matching pattern, the user terminal determines a subframe configuration of each of the transmission point. For example, when the user terminal receives bit information indicating TP 0 as a rate matching pattern, the user terminal determines whether the subframe configuration of TP 0 is of an MBSFN subframe (or NCT) or not.

When the subframe configuration of TP 0 is of an MBSFN subframe (or NCT), the user terminal determines TP 0 has no CRS pattern. On the other hand, when the subframe configuration is of a normal subframe, the user terminal performs rate matching in consideration of the CRS pattern of TP 0 signaled by higher layer signaling.

In addition, when the user terminal receives bit information indicating TP 0+TP 1 as a rate matching pattern and the user terminal determines the TP 0 uses an MBSFN subframe and TP 1 uses a normal subframe, the user terminal performs rate matching in consideration of the CRS pattern of TP 1. Thus, in Step 1, the CRS pattern applied to rate matching is determined in consideration of the subframe configuration of each transmission point.
<Step 2>

The user terminal checks the ZP CSI-RS pattern in each transmission point identified by the bit information. When there is a ZP CSI-RS pattern in the transmission point, the user terminal performs rate matching in consideration of the ZP CSI-RS pattern. Thus, in Step 2, the CRS pattern applied to rate matching is determined in consideration of the ZP CSI-RS pattern of each transmission point.

Next description is made specifically about an application example of the above-described rate matching procedure, with reference to FIG. 14.

Figure 14B:
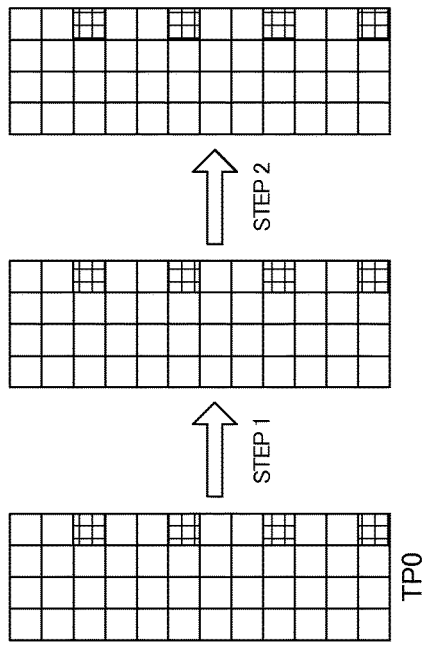
FIG. 14 provides diagrams each illustrating another example of the rate matching procedure performed by the user terminal.
Figure 14D:
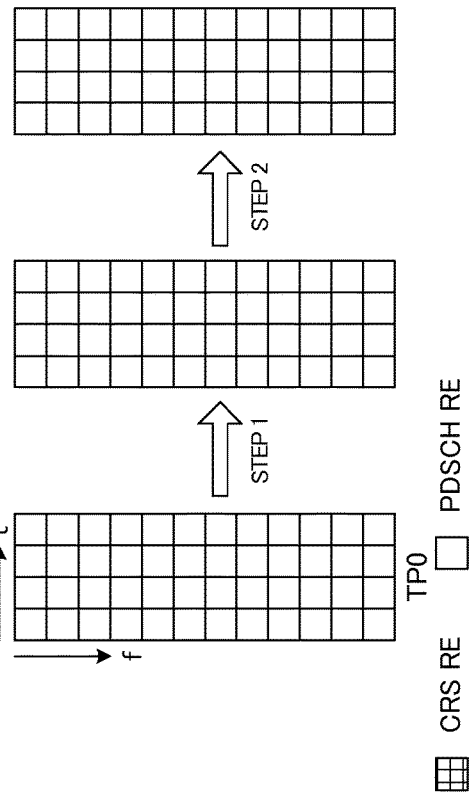
Figure 14A:
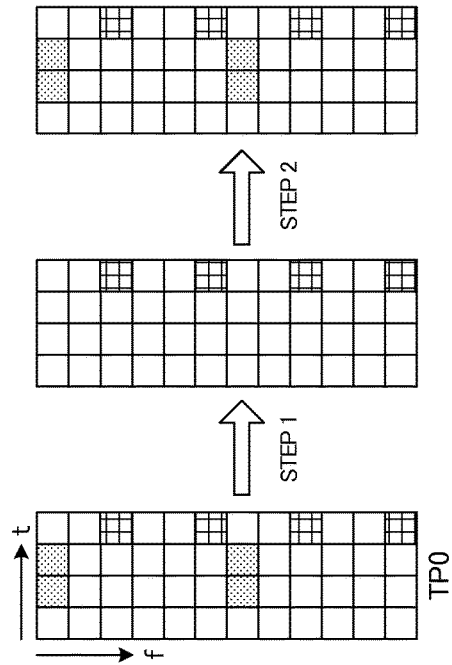

FIG. 14A illustrates the case where a transmission point (here, TP 0) scheduled in a certain subframe uses a normal subframe and ZP CSI-RSs are mapped.

First, the user terminal determines whether the subframe configuration of TP 0 is of an MBSFN subframe (or NCT) or not. Here, TP 0 uses a normal subframe, the user terminal performs rate matching in consideration of the CRS pattern of TP 0 (Step 1). Besides, at TP 0, as the ZP CSI-RSs are also mapped, the user terminal performs rate matching also in consideration of the ZP CSI-RS pattern (Step 2).

FIG. 14B illustrates the case where the transmission point (TP 0) scheduled in a certain subframe uses a normal subframe and no ZP CSI-RS is mapped.

In this case, as the TP 0 uses the normal subframe, the user terminal performs rate matching in consideration of the CRS pattern of TP 0 (Step 1). Besides, at TP 0, as no ZP CSI-RS is mapped, the user terminal performs rate matching without consideration of the ZP CSI-RS pattern (Step 2).

Figure 14C:
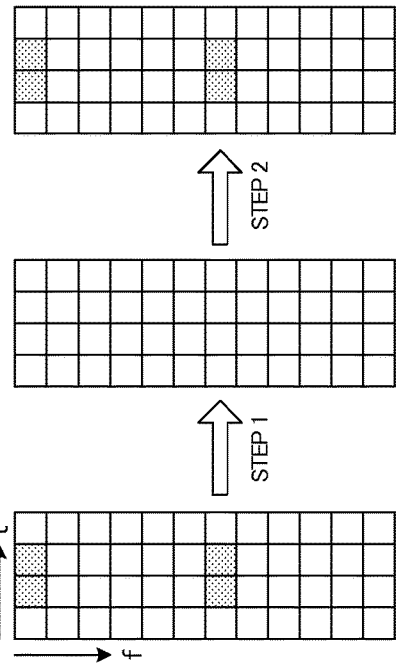

FIG. 14C illustrates the case where the transmission point (TP 0) scheduled in a certain subframe uses an MBSFN subframe (or NCT) and ZP CSI-RSs are mapped.

In this case, as TP 0 uses the MBSFN subframe (or NCT), the user terminal performs rate matching without consideration of the CRS pattern of TP 0 (Step 1). Besides, as ZP CSI-RSs are mapped at TP 0, the user terminal performs rate matching in consideration of the ZP CSI-RS pattern (Step 2).

FIG. 14D illustrates the case where a transmission point (TP 0) scheduled in a certain subframe uses an MBSFN subframe (or NCT) and no ZP CSI-RS is mapped.

In this case, as TP 0 uses the MBSFN subframe (or NCT), the user terminal performs rate matching without consideration of the CRS pattern of TP 0 (Step 1). Besides, as no ZP CSI-RS is mapped at TP 0, the user terminal performs rate matching without consideration of the ZP CSI-RS pattern (Step 2).

Thus, by determining presence or absence of a CRS pattern based on the subframe configuration of a scheduled transmission point and determining presence or absence of a ZP CSI-RS pattern of the transmission point, it is possible to perform rate matching appropriately.

Third Embodiment

Next description is made about a method of selecting an interference measurement (estimation) reference signal resource structure (IMR configuration) of which the radio base station notifies the user terminal by higher layer signaling.

FIG. 15A illustrates the case where in a certain subframe, three transmission points use MBSFN subframes (or NCT)

and the transmission points have mutually different ZP CSI-RS patterns. In this case, the user terminal performs rate matching in consideration of the respective ZP CSI-RS patterns in the three transmission points as illustrated in FIG. 11 above (see FIG. 15B).

Figure 16B:
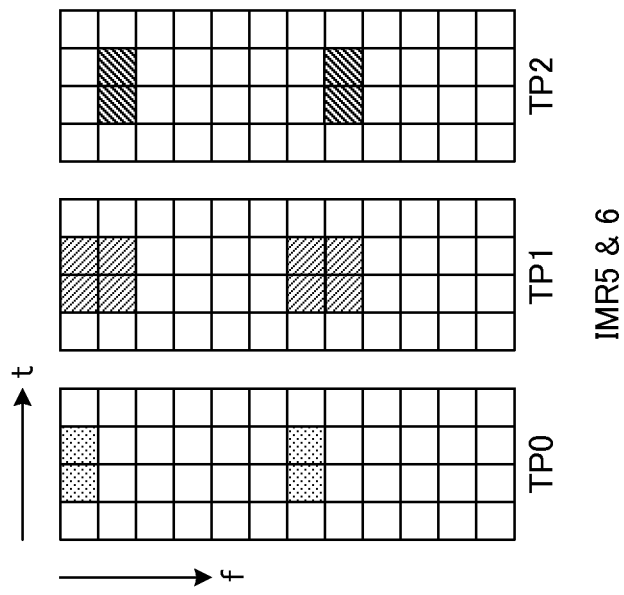
FIG. 16 provides diagrams each illustrating a ZP CSI-RS pattern of predetermined IMR configurations.
Figure 16A:
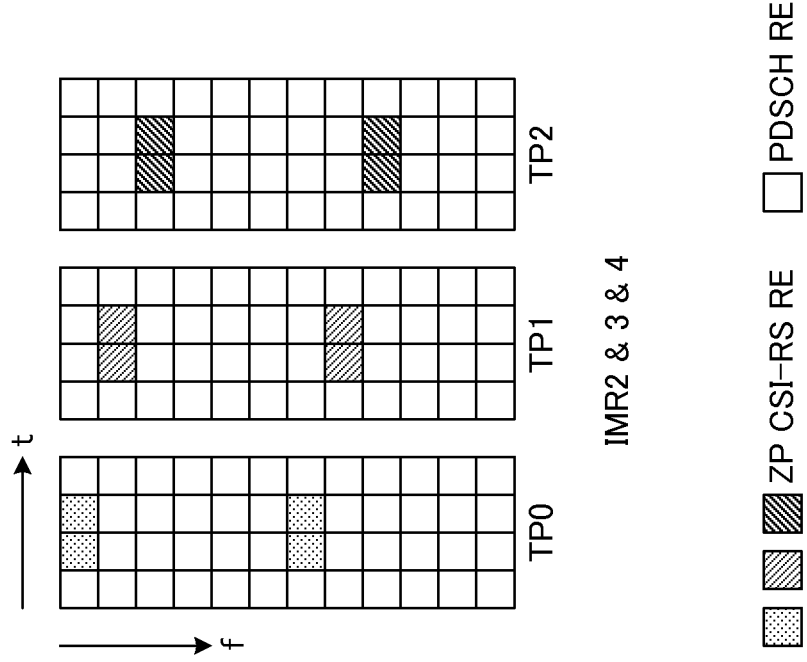

In addition, for example, when the IMRs are configured individually, the plural IMRs may be configured in the same subframe (for example, IMRs 2, 3, 4 in FIG. 16A, IMRs 5, 6 in FIG. 16B). In this case, the user terminal performs rate matching in consideration of the ZP CSI-RS patterns of the respective transmission points (TP 0, TP 1 and TP 2) as illustrated in FIG. 15B.

On the other hand, when CoMP transmission is scheduled dynamically, two transmission points may be scheduled in the subframe (see FIG. 15C). This is because the IMR configurations are signaled from the radio base station to the user terminal by higher layer signaling (e.g., RRC signaling) before CoMP scheduling.

In this case, as illustrated in FIG. 15A, in scheduled TP 0 and TP 1, the positions of ZP CSI-RS resources mapped in TP 2 cannot be used for PDSCH (wasted REs). Consequently, it becomes difficult to achieve effective use of resources.

Then, in the present embodiment, restrictions are put on the IMR configurations (positions of ZP CSI-RSs in frequency-time domains) used by each transmission point. To be more specific, in plural transmission points, the IMR configurations are configured in such a manner that the ZP CSI-RS patterns of two out of the plural transmission points overlap one another. For example, as illustrated in FIG. 16A, control is made to configure IMR 2 and IMR 3 in a certain subframe and not to configure IMR 4 in the same subframe. The following description is made, with reference to FIG. 17, about the case where three transmission points (TP 0, TP 1 and TP 2) form a CoMP set.

In FIG. 17, in a certain subframe, two CSI-RS patterns are applied to the three transmission points. To be more specific, in the subframe where the three transmission points use MBSFN subframe (or NCT), two CSI-RS patterns are applied by restricting the IMR configurations. For example, predetermined IMR configurations are used in combination so that ZP CSI-RSs may be mapped to the same resource positions in scheduled TP 1 and unscheduled TP 2 (joint configure).

Figure 17B:
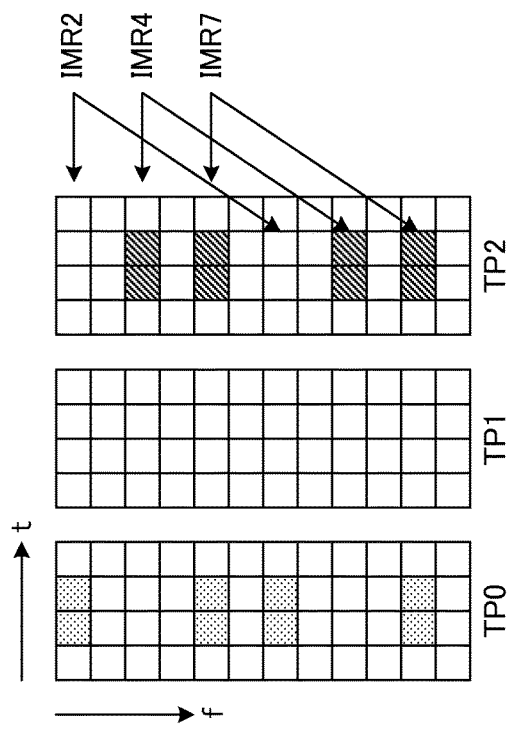
FIG. 17 provides diagrams each illustrating a ZP CSI-RS pattern in which predetermined IMR configurations are selected by restriction.
Figure 17A:
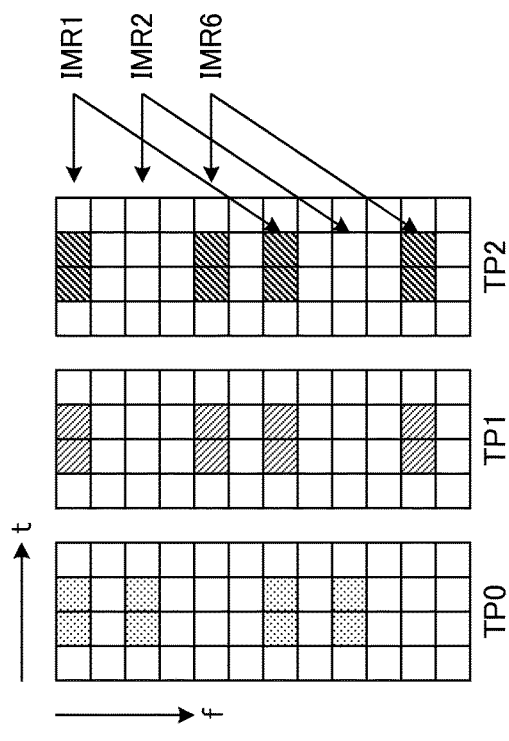

FIG. 17A illustrates the case where IMR 1, 2 and 6 are selected from IMR configurations shown in FIG. 12 above and are configured in combination. In this case, the IMR configurations are arranged in such a manner that out of a plurality of transmission points performing coordinate multi-point transmission, any transmission points (here, TP 1 and TP 2) use the same ZP CSI-RS pattern. In FIG. 17B, IMRs 2, 4 and 7 are configured in combination. In this case, the MBSFN subframe of any transmission point (here, TP 1) out of the plural transmission points performing coordinate multi-point transmission is allocated with no ZP CSI-RS (no resource for ZP CSI-RS). Here, besides the examples shown in FIGS. 17A and 17B, any other combinations such as a combination of IMRs 1, 3 and 7, a combination of IMRs 1, 4 and 5, a combination of IMRs 2, 3 and 5, and a combination of IMRs 3, 4 and 6 may be used as far as two CSI-RS patterns are used in three transmission points.

Next description is made about rate matching where two ZP CSI-RS patterns are applied to three transmission points, with reference to FIG. 18. In FIG. 18, a combination of IMRs 1, 2 and 6 is applied to two transmission points. In this case, ZP CSI-RS patterns used are two CSI-RS patterns of a CSI-RS pattern (pattern 0) at TP 0 and a CSI-RS pattern (pattern 1) at TP 1 and TP 2.

In the case shown in FIG. 18A, there are configured four rate matching patterns corresponding to scheduling results as illustrated in FIG. 18C. When the scheduling result is TP 0 (data transmission is performed from TP 0), the rate matching pattern becomes the CRS pattern of TP 0 and the ZP CSI-RS pattern of TP 0 (pattern 0). When the scheduling result is TP 1, the rate matching pattern becomes the CRS pattern of TP 1 and the ZP CSI-RS pattern of TP 1 (pattern 1). When the scheduling result is TP 2, the rate matching pattern becomes the CRS pattern of TP 2 and the ZP CSI-RS pattern of TP 1 (pattern 1).

Further, when the scheduling result is JT CoMP (TP 0+TP 1, TP 0+TP 2, TP 0+TP 1+TP 2), the rate matching pattern is the CRS pattern of MBSFN subframe (or NCT) and the ZP CSI-RS patterns (pattern 0+pattern 1). On the other hand, as for TP 1 and TP 2 using the MBSFN subframes (or NCT), they uses the same ZP CSI-RS pattern (pattern 1), and the rate matching pattern may be the same as that for the case where the scheduling result is TP 1 (the CRS pattern of TP 1 and the ZP CSI-RS pattern of TP 1 (pattern 1)).

In this case, the user terminal is able to perform rate matching as illustrated in FIG. 18B. When the scheduling result is TP 0+TP 1, TP 0+TP 2, or TP 0+TP 1+TP 2, the radio base station notifies the user terminal of DCI including the bit information "11". The user terminal performs rate matching in consideration of the ZP CSI-RS patterns (pattern 0+pattern 1). When the scheduling result is TP 1+TP 2, the radio base station notifies the user terminal of DCI including the bit information "01". The user terminal performs rate matching in consideration of the ZP CSI-RS pattern (pattern 1).

Thus, even when two CSI-RS patterns are applied to three transmission points, it is possible to perform rate matching appropriately. Further, as the IMR configurations at the respective transmission points are provided in a restricted manner, even when some of the transmission points are only scheduled, it is possible to achieve effective use of resources.

Fourth Embodiment

In the above description, the plural transmission points as JT CoMP have been described as all using MBSFN subframes, however, the present embodiment is not limited to this. JT CoMP may be applied to between a transmission point using a normal subframe and a transmission point using an MBSFN subframe. This case will be described with reference to FIG. 19.

For example, in FIG. 11B mentioned above, TP 0 and TP 1 use MBSFN subframes (or NCT) and TP 2 uses a normal subframe, and TP 0 and TP 1 are scheduled (JT CoMP).

On the other hand, TP 0, TP 1 and TP 2 are scheduled as JT CoMP (FIG. 19A), the user terminal may perform rate matching by selecting the CRS pattern and ZP CSI-RS pattern of TP 2 as a rate matching pattern (bit information "10").

However, in this case, the ZP CSI-RSs of TP 0 and TP 1 are mapped to different resources from those of the ZP CSI-RSs of TP 2, and therefore, it is difficult to perform rate matching in an appropriate manner. Then, in the present embodiment, where JT CoMP is applied to transmission points including a transmission point using a normal subframe and a transmission point using an MBSFN subframe (or NCT), a ZP CSI-RS pattern of the transmission point using the normal subframe is selected to be used. That is, by providing the IMR configurations applied to the respective transmission points in a restricted manner, the ZP CSI-RS pattern at the transmission point using the normal subframe is applied to the transmission points using the MBSFN subframes.

Figure 19B:
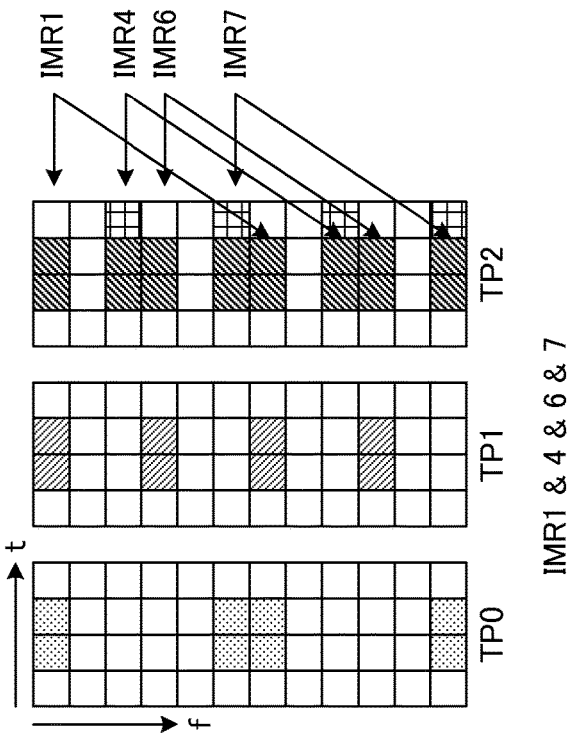
FIG. 19 provides diagrams for explaining rate matching in the case where JT CoMP is applied to between a transmission point using normal subframes and transmission points using MBSFN subframes (or NCT)
Figure 19A:
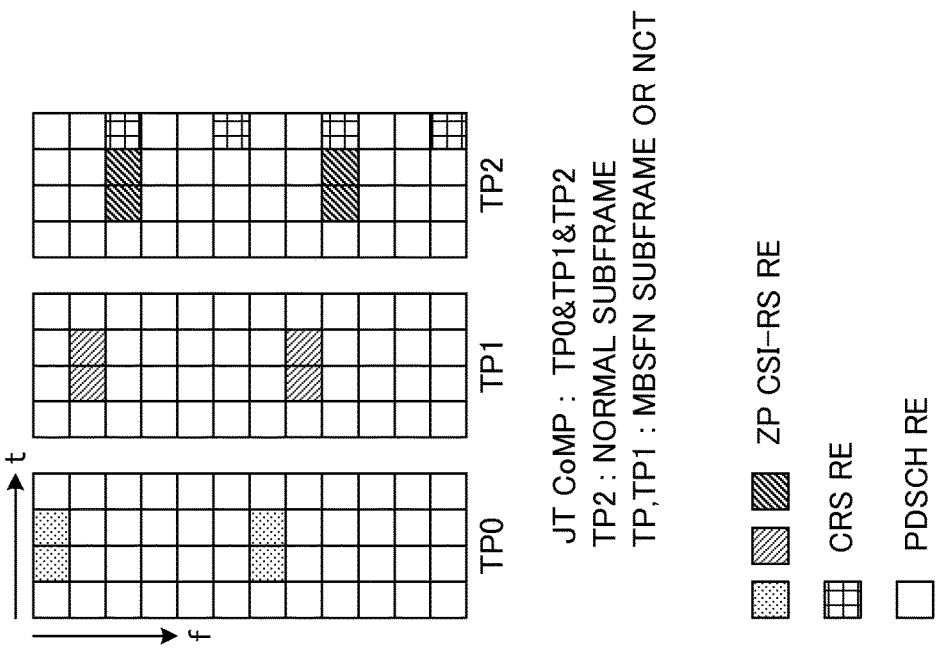

For example, as illustrated in FIG. 19B, the CSI-RS pattern (IMR configuration) configured in TP 2 is configured in TP 0 and TP 1. Here, in the IMR configurations in a CoMP set, a combination including at least the IMR of TP 2 (combination of IMRs 1, 4, 6 and 7) is applied to TP 0 and TP 1. That is, among a plurality of transmission points performing coordinate multi-point transmission, the IMR configurations are provided in such a manner that the resources for ZP CSI-RSs of the transmission points using MBSFN subframes or NCT (here, TP 0 and TP 1) become a subset of resources of ZP CSI-RS of the transmission point using a normal subframes (here, TP 2). With this structure, even when the user terminal performs rate matching using the CRS pattern and CSI-RS pattern of TP 2, the rate matching is able to be performed appropriately.

In this way, by restricting the IMR configurations in such a manner as to make the ZP CSI-RS pattern of a transmission point using an MBSFN subframe overlap the ZP CSI-RS pattern of a transmission point using a normal subframe, it is possible to perform rate matching appropriately <Configuration of Radio Communication System>

Figure 20:
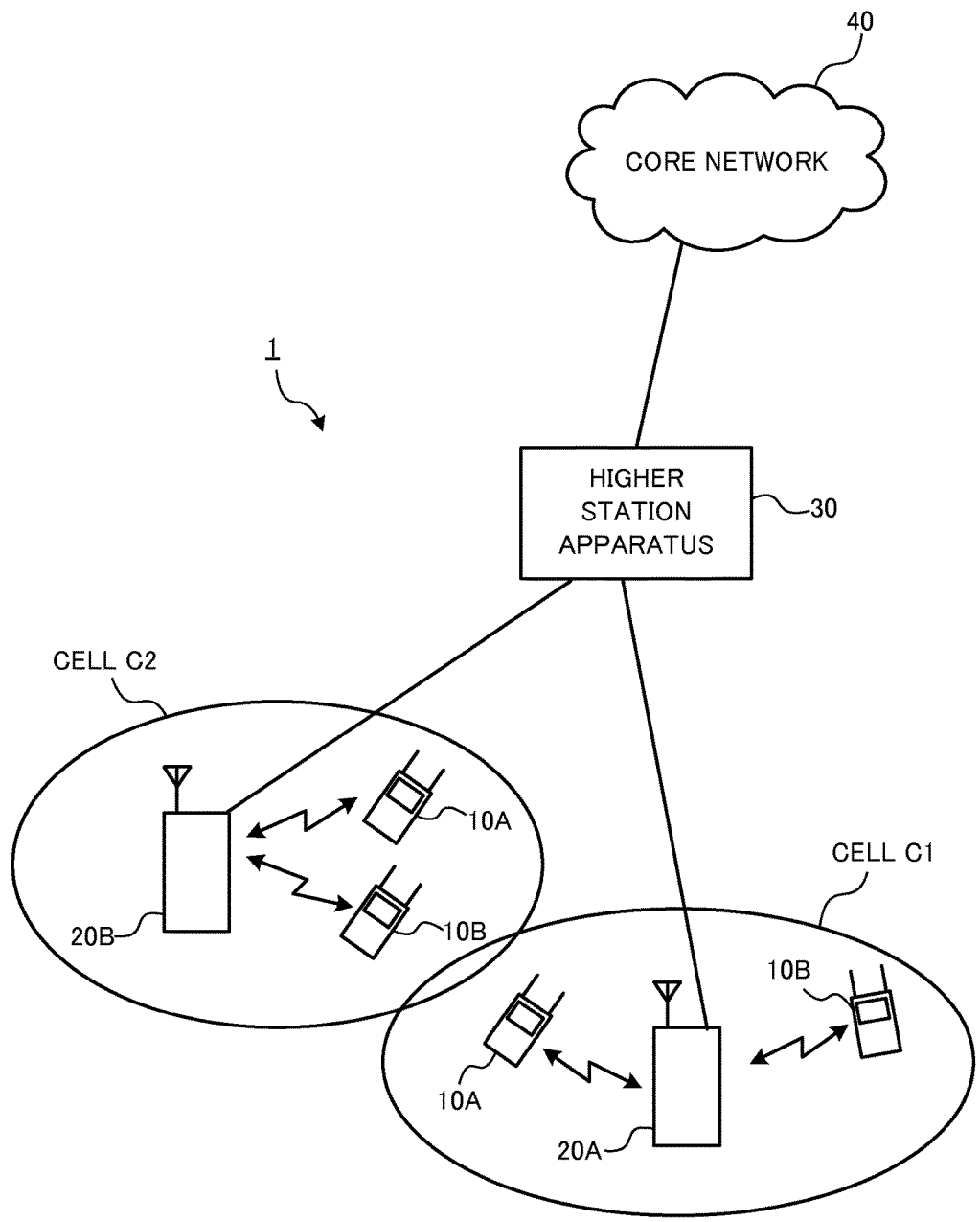
FIG. 20 is a diagram for explaining the system configuration of a radio communication system.

Next description is made in detail about a radio communication system according to the present embodiment. FIG. 20 is a diagram for explaining the system configuration of a radio communication system according to the present embodiment. The radio communication system illustrated in FIG. 20 is the LTE system or a system including SUPER 3G. In this radio communication system, carrier aggregation is adopted such that a plurality of basic frequency blocks (component carriers) are aggregated, each of the basic frequency blocks being a unit of a system band of the LTE system. In addition, this radio communication system may be called IMT-Advanced or 4G.

As illustrated in FIG. 20, the radio communication system 1 is configured to include radio base stations 20A and 20B and a plurality of user terminals such as a first user terminal 10A and a second user terminal 10B, which communicate with the radio base stations 20A and 20B. Each of the radio base stations 20A and 20B is connected to a higher station apparatus 30, and the higher station apparatus 30 is connected to a core network 40. The radio base stations 20A and 20B are connected wiredly or wirelessly to each other. The first and second user terminals 10A and 10B are able to communicate with the radio base stations 20A and 20B in cells C1 and C2, respectively. The higher station apparatus 30 includes, but is not limited to, an access gateway apparatus, a radio network controller (RNC), a mobility management entity (MME) and so on. Between the cells, control of CoMP transmission is made by a plurality of base stations according to need.

Each of the first user terminal 10A and the second user terminal 10B may comprise an LTE terminal or an LTE-A terminal, however, they are described as the first and second user terminals below, except where specifically noted. In addition, for convenience of explanation, in the following description, it is the first user terminal 10A and the second user terminal 10B that perform wireless communications with the radio base stations 20A and 20B. However, more generally, the user terminals (UE) may be user terminals including a mobile terminal apparatus and a fixed terminal.

In the radio communication system 1, as radio access schemes, OFDMA (Orthogonal Frequency Division Multiple Access) is applied to the downlink, and SC-FDMA (Single-Carrier Frequency-Division Multiple Access) is applied to the uplink, though the uplink radio access scheme is not limited to SC-FDMA. OFDMA is a multi-carrier transmission scheme to perform communication by dividing a frequency band into a plurality of narrow frequency bands (subcarriers) and mapping data to each subcarrier. SC-FDMA is a single carrier transmission scheme to perform communications by dividing, per terminal, the system band into bands formed with one or continuous resource blocks, and allowing a plurality of terminals to use mutually different bands thereby to reduce interference between terminals.

The downlink communication channel includes a PDSCH which is a downlink data channel used by each of the first user terminal 10A and the second user terminal 10B on a shared basis, and downlink L1/L2 control channels (PDCCH, PCFICH, PHICH). PDSCH is used to transmit transmission data and higher control information. PDCCH is used to transmit scheduling information of PUSCH and PDSCH and the like. PCFICH (Physical Control Format Indicator Channel) is used to transmit OFDM symbol number used in PDCCH. PHICH (Physical Hybrid-ARQ Indicator Channel) is used to transmit ACK/NACK of HARQ of PUSCH.

The uplink communication channels include a PUSCH which is an uplink data channel used by each user terminal on a shared basis, and a PUCCH which is an uplink control channel. This PUSCH is used to transmit transmission data and higher control information. The PUCCH is used to transmit RI, PMI, CQI and other channel state information (CSI), ACK/NACK, and so on.

Figure 21:
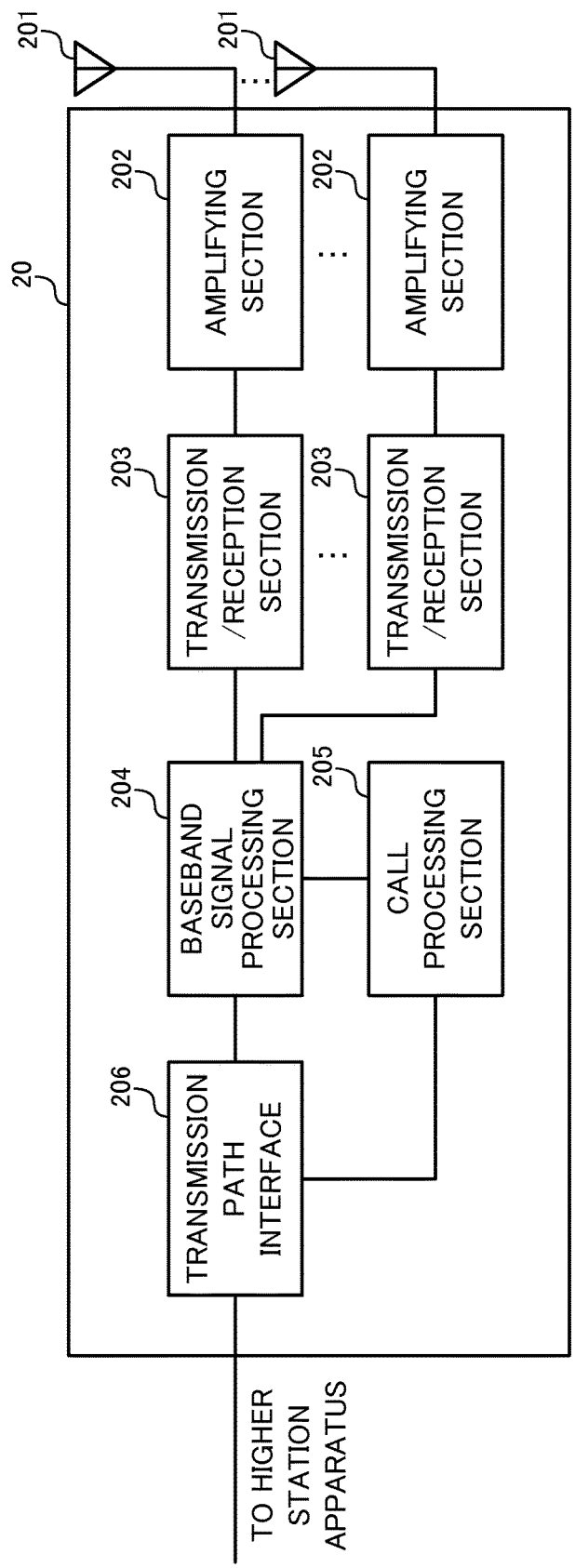
FIG. 21 is a diagram for explaining the overall configuration of the radio base station.

With reference to FIG. 21, an overall configuration of the radio base station according to the present embodiment will be described below. As the radio base stations 20A and 20B have the same structures, they are described together as a radio base station 20 below. As the first and second user terminals 10A and 10B, described later, also have the same structures, they are described as a user terminal 10 below.

The radio base station 20 has transmission/reception antennas 201, amplifying sections 202, transmission/reception sections (notifying sections) 203, a baseband signal processing section 204, a call processing section 205 and a transmission path interface 206. Transmission data that is to be transmitted on the downlink from the radio base station 20 to the user terminal is input from the higher station apparatus 30, through the transmission path interface 206, into the baseband signal processing section 204.

In the baseband signal processing section 204, downlink data channel signals are subjected to PDCP layer processing, RLC (Radio Link Control) layer transmission processing such as division and coupling of transmission data and RLC retransmission control transmission processing, MAC (Medium Access Control) retransmission control, including, for example, HARQ transmission processing, scheduling, transport format selection, channel coding, inverse fast Fourier transform (IFFT) processing, and precoding processing. As for signals of the physical downlink control channel as the downlink control channel, transmission processing is performed, including channel coding and inverse fast Fourier transform.

The baseband signal processing section 204 notifies each user terminal 10 connected to the same cell of control information for the user terminal 10 to perform wireless communications with the radio base station 20, by a broadcast channel. Information for communication in this cell includes, for example, uplink or downlink system bandwidth, identification information of a root sequence (Root Sequence Index) for generating random access preamble singles in PRACH (Physical Random Access Channel) and so on.

In each transmission/reception section 203, baseband signals which are output from the baseband signal processing section 204 are subjected to frequency conversion processing into a radio frequency band. The amplifying section 202 amplifies the radio frequency signals having been subjected to frequency conversion, and outputs the resultant signals to the transmission/reception antenna 201. The transmission/reception section 203 serves as a transmission section for transmitting downlink control information including bit information defining a rate matching pattern to the user terminal, a transmission section for transmitting a resource configuration of interference measurement reference signals by higher layer signaling (e.g., RRC signaling) or the like.

Meanwhile, as for data to be transmitted on the uplink from the user terminal 10 to the radio base station 20, radio frequency signals are received in each transmission/reception antenna 201, amplified in the amplifying section 202, subjected to frequency conversion and converted into baseband signals in the transmission/reception section 203, and the resultant signals are input to the baseband signal processing section 204.

The baseband signal processing section 204 performs FFT processing, IDFT processing, error correction decoding, MAC retransmission control reception processing, and RLC layer and PDCP layer reception processing on the transmission data included in the baseband signals received on the uplink. Then, the decoded signals are transferred to the higher station apparatus 30 through the transmission path interface 206.

The call processing section 205 performs call processing such as setting up and releasing a communication channel, manages the state of the radio base station 20 and manages the radio resources.

Figure 22:
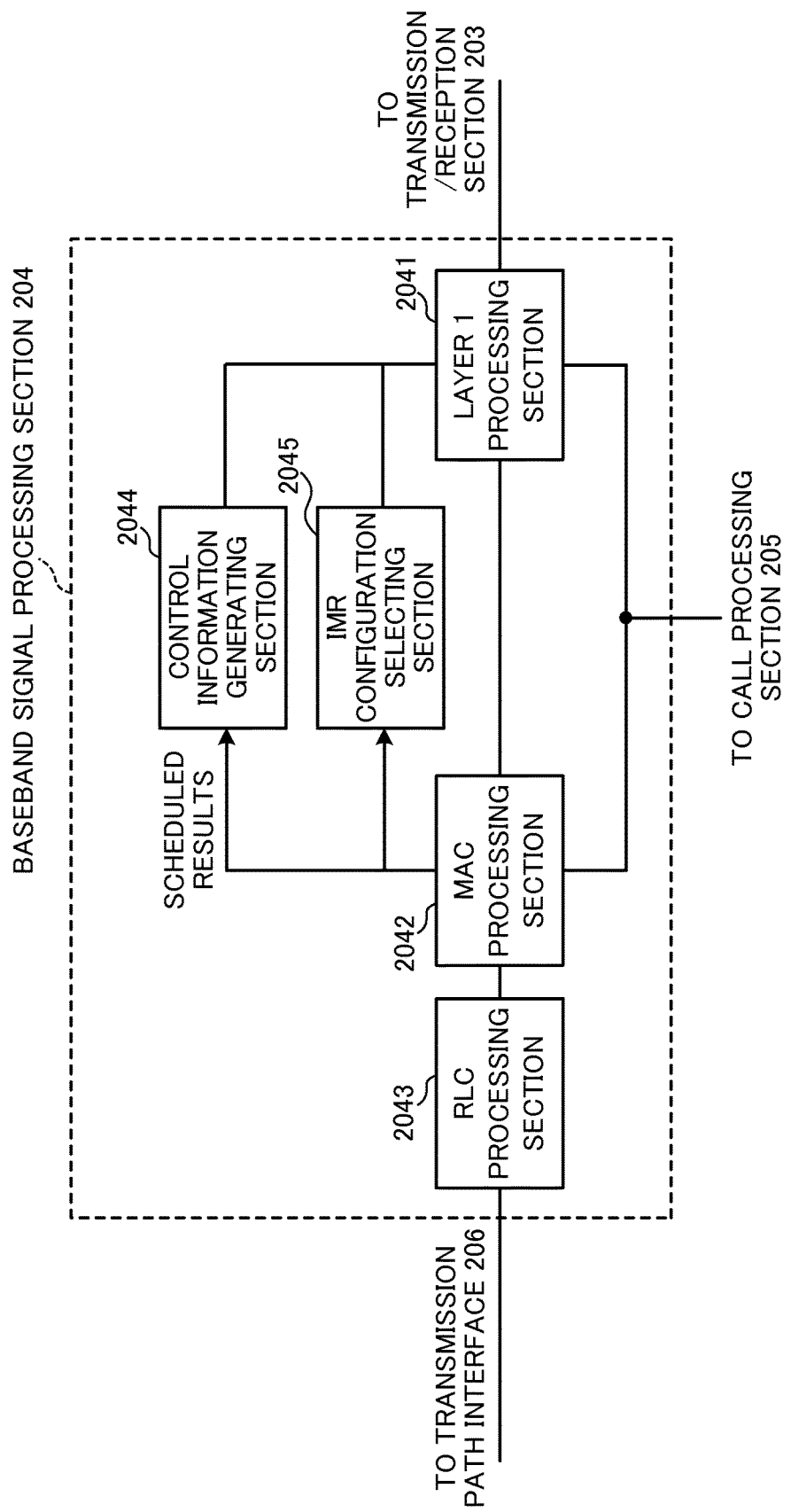
FIG. 22 is a functional block diagram corresponding to a baseband signal processing section of the radio base station.

FIG. 22 is a block diagram illustrating the configuration of the baseband signal processing section in the radio base station illustrated in FIG. 21. The baseband signal processing section 204 is configured to mainly have a layer 1 processing section 2041, a MAC processing section 2042, an RLC processing section 2043, a control information generating section 2044, and an IMR configuration selecting section 2045.

The layer 1 processing section 2041 mainly performs processing regarding the physical layer. The layer 1 processing section 2041 performs processing including, for example, channel decoding, DFT (Discrete Fourier Transform), frequency demapping, IFFT (Inverse Fast Fourier Transform), data demodulation on the signals received on the uplink. The layer 1 processing section 2041 also performs processing including channel coding, data modulation, frequency mapping, and IFFT (Inverse Fast Fourier Transform) on the signals to transmit on the downlink.

The MAC processing section 2042 performs processing including MAC layer retransmission control, uplink/downlink scheduling, PUSCH/PDSCH transport format selection, and PUSCH/PDSCH resource block selection on the signals received on the uplink.

The RLC processing section 2043 performs packet division, packet coupling, RLC layer retransmission control and the like on the packets received on the uplink and packets to transmit on the downlink.

The control information generating section 2044 selects a predetermined rate matching pattern of which to notify the user terminal based on a scheduling result, and generates downlink control information including bit information defining the rate matching pattern. For example, the control information generating section 2044 selects the rate matching pattern based on the scheduling result using the table illustrated in FIG. 9 mentioned above, and generates downlink control information (DCI) including predetermined bit information.

For example, in a certain subframe, when data signals are transmitted to the user terminal from TP 0 and TP 1 using MBSFN subframes (or NCT) as a scheduling result (JT CoMP), the control information generating section 2044 generates downlink control information including bit information "11" based on Table 1 and Table 2 in FIG. 9. The downlink control information generated by the control information generating section 2044 is sent to the user terminal via the transmission/reception section 203.

The IMR configuration selecting section 2045 selects a resource configuration (IMR configuration) for interference measurement reference signals to send to the user terminal. The IMR configuration selecting section 2045 selects a predetermined IMR configuration from resource configurations of ZP CSI-RSs of the transmission points that constitute the CoMP set as shown in FIG. 12 (positions identified in the frequency-time domains).

In addition, the IMR configuration selecting section 2045 restricts the resource configuration of interference measurement reference signals to send to the user terminal. For example, as described in the third embodiment above, when two (TP 0 and TP 1) out of three (TP 0, TP 1 and TP 2) of the CoMP set are scheduled, the IMR configuration is selected (restricted) in such a manner that the ZP CSI-RS patterns of two transmission points (TP 1 and TP 2) become the same.

Besides, as described in the fourth embodiment mentioned above, when JT CoMP is applied to transmission points including a transmission point using a normal subframe (e.g., TP 2) and a transmission point (e.g., TP 0, TP 1) using an MBSFN subframe, the IMR configuration used by TP 0 and TP 1 is selected in such a manner as to overlap that of TP 2.

Next, with reference to FIG. 23, an overall configuration of the user terminal according to the present embodiment will be described below. As the LTE terminal and LTE-A terminal are the same in principal structure of hardware, they are described undiscriminatingly. The user terminal 10 has transmission/reception antennas 101, amplifying sections 102, transmission/reception sections (reception section) 103, a baseband signal processing section 104 and an application section 105.

As for downlink data, radio frequency signals received in the transmission/reception antennas 101 are amplified in the respective amplifying sections 102, and subjected to frequency conversion into baseband signals in the transmission/reception sections 103. These baseband signals are subjected to reception processing such as FFT processing, error correction decoding and retransmission control in the baseband signal processing section 104. In this downlink data, downlink transmission data is transferred to the application section 105. The application section 105 performs processing related to higher layers above the physical layer and the MAC layer. In the downlink data, broadcast information is also transferred to the application section 105.

On the other hand, uplink transmission data is input from the application section 105 to the baseband signal processing section 104. In the baseband signal processing section 104, mapping processing, retransmission control (HARQ) transmission processing, channel coding, DFT processing, IFFT processing and so on are performed. In the transmission/ reception sections 103, the baseband signals output from the baseband signal processing section 104 are converted into a radio frequency band. After that, the frequency-converted radio frequency signals are amplified in the amplifying sections 102, and then, transmitted from the transmission/reception antennas 101. Each of the transmission/reception sections 103 serves as a reception section for receiving downlink control information including bit information defining a predetermined rate matching pattern, or the like.

Figure 23:
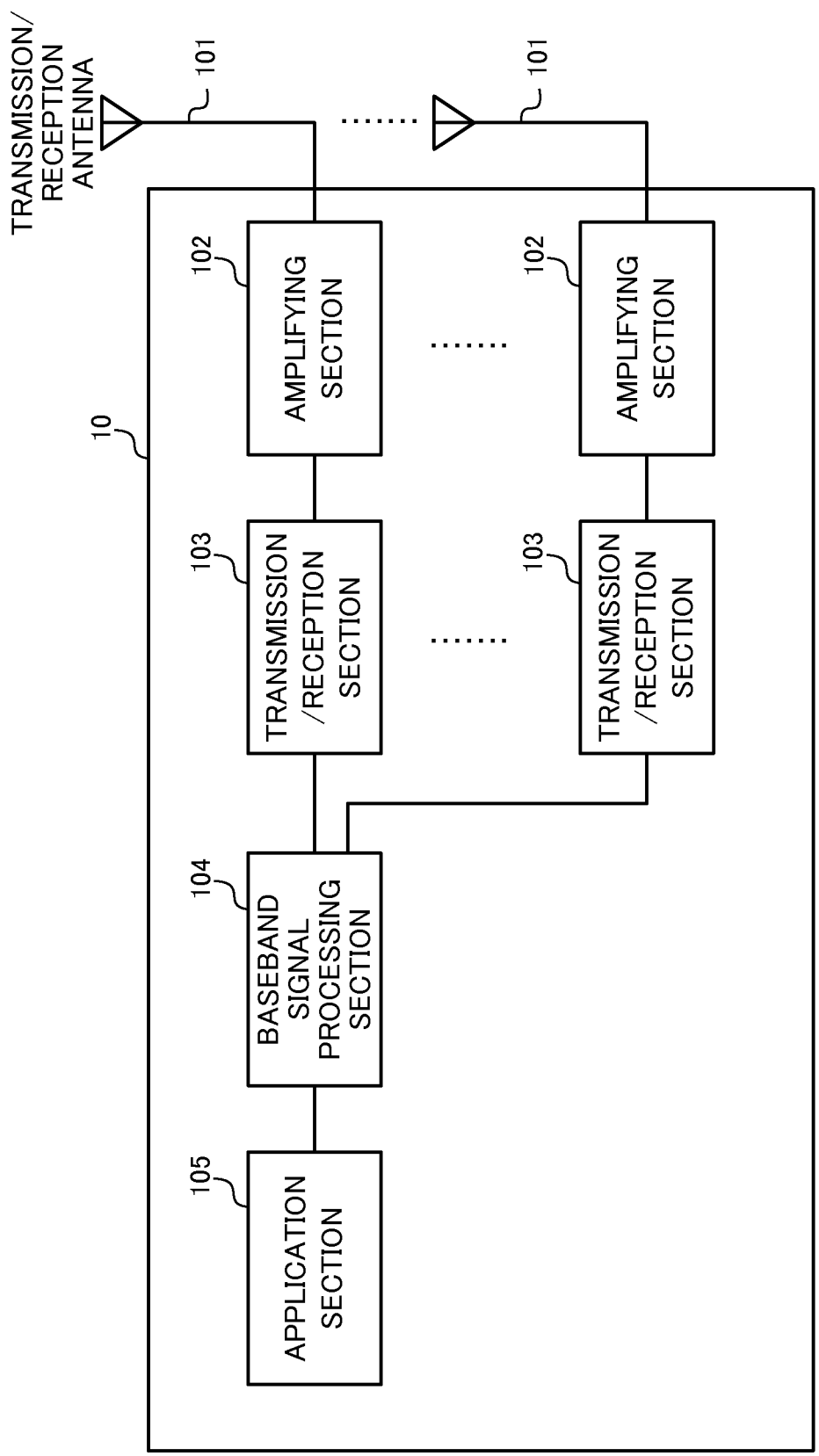
FIG. 23 is a diagram for explaining the coverall configuration of the user terminal.
Figure 24:
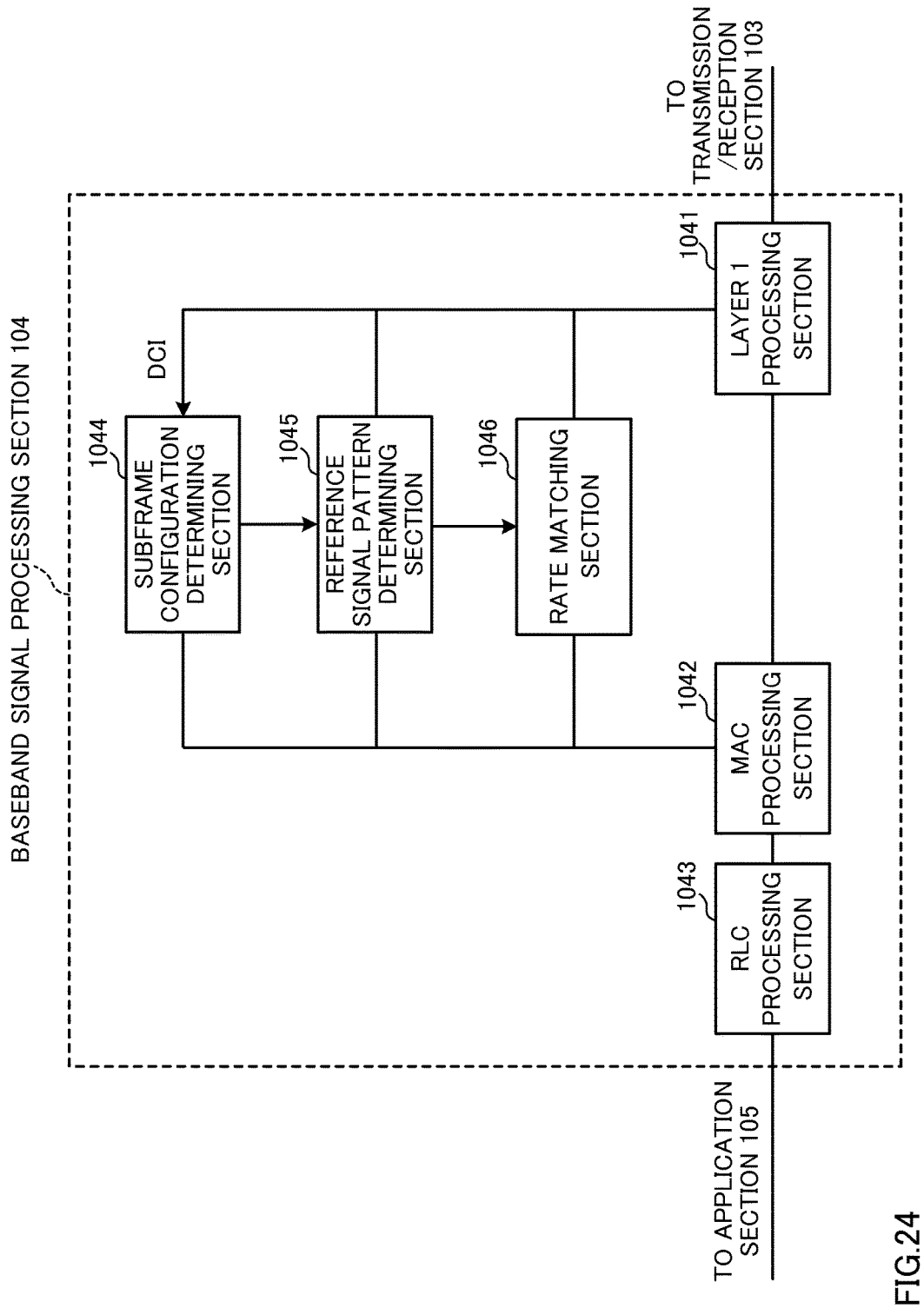
FIG. 24 is a functional block diagram corresponding to a baseband signal processing section of the user terminal.

FIG. 24 is a block diagram illustrating the configuration of the baseband signal processing section in the user terminal as shown in FIG. 23. The baseband signal processing section 104 is configured to mainly have a layer 1 processing section 1041, a MAC processing section 1042, an RLC processing section 1043, a subframe configuration determining section 1044, a reference signal pattern determining section 1045 and a rate matching section 1046. The subframe configuration determining section 1044, the reference signal pattern determining section 1045 and the rate matching section 1046 serve in combination as a rate matching processing section.

The layer 1 processing section 1041 mainly performs processing relating to the physical layer. The layer 1 processing section 1041 performs processing including, for example, channel decoding, DFT (Discrete Fourier Transform) processing, frequency demapping, IFFT (Inverse Fast Fourier Transform) processing, data demodulation and the like, on signals received on the downlink. The layer 1 processing section 1041 also performs channel coding, data modulation, frequency mapping, IFFT (Inverse Fast Fourier Transform) and so on, on signals to transmit on the uplink.

The MAC processing section 1042 performs MAC layer retransmission control (HARQ), analysis of downlink scheduling information (identification of PDSCH transport format and identification of PDSCH resource blocks) and son on, on signals received on the downlink. The MAC processing section 1042 also performs MAC retransmission control, analysis of uplink scheduling information (identification of PUSCH transport format and identification of PUSCH resource blocks) and so on, on signals to transmit on the uplink.

The RLC processing section 1043 performs dividing of packets, coupling of packets, RLC layer retransmission control and the like on packets received on the downlink and packets to transmit on the uplink.

The subframe configuration determining section 1044 determines the subframe configuration of each transmission point (radio base station) in the CoMP set. For example, the subframe configuration determining section 1044 determines whether the subframe configuration of a scheduled transmission point or subframe configurations of all the transmission points in a certain subframe are of MBSFN subframes (or NCT) or not.

For example, as illustrated in the first embodiment above, when in a certain subframe, the radio base station notifies the user terminal of "11" shown in FIG. 9 as bit information defining the rate matching pattern, the subframe configuration determining section 1044 checks the subframe configurations of all the transmission points that constitute the CoMP set. Then, the subframe configuration determining section 1044 determines the number (A) of transmission points each using an MBSFN subframe (or NCT) in the certain subframe (Step 1 in FIG. 11). Note that determination of the subframe configuration is performed based on higher layer signaling (e.g., RRC signaling) by the radio base station.

The reference signal pattern determining section 1045 determines a reference signal pattern (CRS pattern and/or ZP CSI-RS pattern) applied to the rate matching. For example as illustrated in the first embodiment above, when the radio base station notifies the user terminal of "11" shown in FIG. 9 as bit information defining the rate matching pattern, the reference signal pattern determining section 1045 checks ZP CSI-RS configurations (ZP CSI-RS patterns) of the A transmission points using MBSFN subframes (or NCT) specified in the subframe configuration determining section 1044. Then, the reference signal pattern determining section 1045 determines the number (B) of ZP CSI-RS patterns of the A transmission points (Step 2 in FIG. 11).

The rate matching section 1046 performs rate matching based on a rate matching pattern determined by the reference signal pattern determining section 1045. For example, the rate matching section 1046 performs rate matching in the subframe in consideration of the B ZP CSI-RS patterns determined by the reference signal pattern determining section 1045 (Step 3 in FIG. 11).

With this structure, even when scheduling information in the case where data signals are transmitted from a plurality of transmission points using MBSFN subframes (or NCT) (JT CoMP) is all defined in predetermined bit information (e.g., "11"), it is possible to perform rate matching appropriately.

Up to this point, the present invention has been described using the above-described embodiments, however, the present invention is not limited to the above-described embodiments and may be embodied in various modified forms. For example, CSI-RS position, muting (zero power) position, the number of processing sections, processing procedure, the number of CSI-RSs, the number of muting resources, and the number of transmission points may be modified as appropriate. In the above description, the plural transmission points have been described as being a plurality of radio base stations, however, the transmission points may be antennas. Further, the above-mentioned first to fourth embodiments may be applied appropriately in combination. Furthermore, other modifications may be also made appropriately without departing from the scope of the present invention.

The disclosure of Japanese Patent Application No. 2012-217099 filed on Sep. 28, 2012, including the specification, drawings, and abstract, is incorporated herein by reference in its entirety.

The invention claimed is:

1. A radio communication system comprising: a plurality of radio base stations; and a user terminal that is configured to be able to perform coordinate multi-point transmission and reception with the plurality of radio base stations, wherein each of the radio base stations has: a transmitter that transmits downlink control information including bit information defining a predetermined rate matching pattern to the user terminal, the predetermined rate matching pattern being selected from a table defining a plurality of rate matching patterns, the user terminal has:

a receiver that receives the downlink control information; and a processor coupled to a memory that performs rate matching based on the bit information defining the predetermined rate matching pattern, the plurality of rate matching patterns comprise a rate matching pattern having combinations of a cell-specific reference signal pattern and an interference measurement reference signal pattern used where transmission is performed from a plurality of radio base stations using an MBSFN subframe or new carrier type, the combinations being aggregated in a first plurality of bits and a rate matching pattern having a combination of an interference measurement reference signal pattern and cell-specific reference signal patterns corresponding to each radio base station using a normal subframe, the combination being defined in a second plurality of bits different from the first plurality of bits, when the receiver receives the first plurality of bits, the processor performs the rate matching based on the bit information as well as subframe configurations and the interference measurement reference signal patterns of the radio base station, and when the receiver receives the second plurality of bits, the processor performs the rate matching by determining the cell-specific reference signal pattern based on a subframe configuration of the radio base station indicated by the second plurality of bits and determining the interference measurement reference signal pattern of the radio base station indicated by the second plurality of bits.

2. The radio communication system according to claim 1, wherein, when the receiver receives the first plurality of bits, the processor specifies each radio base station using an MBSFN subframe or new carrier type and performs the rate matching based on the interference measurement reference signal pattern transmitted from the radio base station using the MBSFN subframe or new carrier type.

3. The radio communication system according to claim 1, wherein the transmitter of each of the radio base stations performing coordinated multi-point transmission notifies the user terminal of a resource configuration of interference measurement reference signals of the radio base station.

4. The radio communication system according to claim 3, wherein the transmitter of each of the radio base stations performing the coordinated multi-point transmission arranges the resource configuration of interference measurement reference signals based on subframe configurations and offsets used by the radio base stations.

5. The radio communication system according to claim 3, wherein the transmitter arranges the resource configurations of interference measurement reference signals in such a manner that any of the radio base stations performing the coordinate multi-point transmission have same interference measurement reference signal patterns.

6. The radio communication system according to claim 3, wherein the transmitter arranges the resource configurations of interference measurement reference signals in such a manner that the interference measurement reference signals are not allocated to an MBSFN subframe or new carrier type in any of the radio base stations performing the coordinate multi-point transmission.

7. The radio communication system according to claim 3, wherein the transmitter arranges the resource configurations of interference measurement reference signals in such a manner that among the radio base stations performing the coordinate multi-point transmission, resources of interference measurement reference signals of a radio base station using an MBSFN subframe or new carrier type become a subset of resources of interference measurement reference signals of a radio base station using a normal subframe.

8. The radio communication system according to claim 2, wherein the transmitter of each of the radio base stations performing coordinated multi-point transmission notifies the user terminal of a resource configuration of interference measurement reference signals of the radio base station.

9. A radio communication method for a plurality of radio base stations and a user terminal that is configured to be able to perform coordinate multi-point transmission and reception with the plurality of radio base stations, the radio communication method comprising the steps of:

by each of the radio base stations,
transmitting downlink control information including bit information defining a predetermined rate matching pattern to the user terminal, the predetermined rate matching pattern being selected from a table defining a plurality of rate matching patterns;

by the user terminal,
receiving the downlink control information and
performing rate matching based on the bit information defining the predetermined rate matching pattern, wherein the plurality of rate matching patterns comprise a rate matching pattern having combinations of a cell-specific reference signal pattern and an interference measurement reference signal pattern used where transmission is performed from a plurality of radio base stations using an MBSFN subframe or new carrier type, the combinations being aggregated in a first plurality of bits, and a rate matching pattern having a combination of an interference measurement reference signal pattern and a cell-specific reference signal pattern corresponding to each radio base station using a normal subframe, the combination being defined in a second plurality of bits different from the first plurality of bits, when receiving the first plurality of bits, the user terminal performs the rate matching based on the bit information as well as subframe configurations and the interference measurement reference signal patterns of the radio base stations, and when receiving the second plurality of bits, the user terminal performs the rate matching by determining the cell-specific reference signal pattern based on a subframe configuration of the radio base station indicated by the second plurality of bits and determining the interference measurement reference signal pattern of the radio base station indicated by the second plurality of bits.

10. A user terminal configured to be able to perform coordinate multi-point transmission and reception with a plurality of radio base stations, the user terminal comprising:

a receiver that receives downlink control information including bit information defining a predetermined rate matching pattern, the predetermined rate matching pattern being selected from a table defining a plurality of rate matching patterns; and a processor coupled to a memory that performs rate matching based on the bit information defining the predetermined rate matching pattern, wherein the plurality of rate matching patterns comprise a rate matching pattern having combinations of a cell-specific reference signal pattern and an interference measurement reference signal pattern used where transmission is performed from a plurality of radio base stations using an MBSFN subframe or new carrier type, the combinations being aggregated in a first plurality of bits, and a rate matching pattern having a combination of interference measurement reference signal pattern and a cell-specific reference signal pattern corresponding to each radio base station using a normal subframe, the combination being defined in a second plurality of bits different from the first plurality of bits, when the receiver receives the first plurality of bits, the processor performs the rate matching based on the bit information as well as subframe configurations and the interference measurement reference signal patterns of the radio base stations, and when the receiver receives the second plurality of bits, the processor performs the rate matching by determining the cell-specific reference signal pattern based on a subframe configuration of the radio base station indicated by the second plurality of bits and determining the interference measurement reference signal pattern for the radio base station indicated by the second plurality of bits.

11. A radio base station in a radio communication system having a plurality of radio base stations; and a user terminal that is configured to be able to perform coordinate multi-point transmission and reception with the plurality of radio base stations, the radio base station comprising:

a processor coupled to a memory that selects a predetermined rate matching pattern from a table defining a plurality of rate matching patterns based on a scheduling result and generates downlink control information including bit information defining the predetermined rate matching pattern;

the processor selects a resource configuration of interference measurement reference signals based on subframe configurations and offsets of a plurality of radio base stations performing coordinate multi-point transmission; and a transmitter that transmits the downlink control information and the resource configuration of interference measurement reference signals to the user terminal, when the receiver receives a plurality of bits, the processor performs the rate matching by determining the cell-specific reference signal pattern based on a subframe configuration of the radio base station indicated by the plurality of bits and determining the interference measurement reference signal pattern of the radio base station indicated by the plurality of bits.

* * * * *